US007633917B2

(12) United States Patent
Patel et al.

(10) Patent No.: US 7,633,917 B2
(45) Date of Patent: Dec. 15, 2009

(54) MOBILE NETWORK DEVICE MULTI-LINK OPTIMIZATIONS

(75) Inventors: Alpesh S. Patel, Pleasanton, CA (US); Gopal K. Dommety, San Jose, CA (US); Milind M. Kulkarni, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 566 days.

(21) Appl. No.: 11/372,598

(22) Filed: Mar. 10, 2006

(65) Prior Publication Data

US 2007/0211723 A1  Sep. 13, 2007

(51) Int. Cl.
    *H04W 4/00*  (2009.01)
(52) U.S. Cl. ..................... 370/338; 455/435.1
(58) Field of Classification Search ........... None
    See application file for complete search history.

(56) References Cited

U.S. PATENT DOCUMENTS

| | | | |
|---|---|---|---|
| 4,692,918 A | 9/1987 | Elliott et al. |
| 5,016,244 A | 5/1991 | Massey et al. |
| 5,018,133 A | 5/1991 | Tsukakoshi et al. |
| 5,218,600 A | 6/1993 | Schenkyr et al. |
| 5,371,852 A | 12/1994 | Attanasio et al. |
| 5,473,599 A | 12/1995 | Li et al. |
| 5,572,528 A | 11/1996 | Shuen |
| 5,572,582 A | 11/1996 | Riddle |
| 5,619,552 A | 4/1997 | Karppanen et al. |
| 5,729,537 A | 3/1998 | Billstrom |
| 5,793,762 A | 8/1998 | Penners et al. |
| 5,825,759 A | 10/1998 | Liu |
| 5,862,345 A | 1/1999 | Okanoue et al. |
| 6,078,575 A | 6/2000 | Dommety et al. |

(Continued)

FOREIGN PATENT DOCUMENTS

WO   WO 01/35585   5/2001

(Continued)

OTHER PUBLICATIONS

Release notes for 3Com Corporation, "Conducting a Redundant Route for Network Resiliency," Mar. 1994, *NET Builder Family Bridge/Router* pp. 26-29.

(Continued)

*Primary Examiner*—Erika A Gary
(74) *Attorney, Agent, or Firm*—Weaver Austin Villeneuve & Sampson LLP

(57) ABSTRACT

Methods and apparatus for performing optimizations for a mobile network device such as a Mobile Node or Mobile Router supporting multiple links to a Home Agent (or Correspondent Node in a Mobile IPv6 environment) are disclosed. During the registration process, link characteristics are transmitted in the registration request. From the link characteristics, it is possible to determine whether the mobile network device has roamed from a high to a low bandwidth link, or vice versa. A first set of optimizations may be performed when the mobile network device has roamed from a high to a low bandwidth link, while a second set of optimizations may be performed when the mobile network device has roamed from a low to a high bandwidth link. Some optimizations may be performed during the establishment of a TCP session, while others may be performed during or upon completion of the Mobile IP registration process.

38 Claims, 15 Drawing Sheets

U.S. PATENT DOCUMENTS

| | | | |
|---|---|---|---|
| 6,130,892 | A | 10/2000 | Short et al. |
| 6,195,705 | B1 | 2/2001 | Leung et al. |
| 6,230,012 | B1 | 5/2001 | Willkie et al. |
| 6,339,830 | B1 | 1/2002 | See et al. |
| 6,393,482 | B1 | 5/2002 | Rai et al. |
| 6,407,988 | B1 | 6/2002 | Agraharam et al. |
| 6,434,134 | B1 | 8/2002 | La Porta et al. |
| 6,473,411 | B1 | 10/2002 | Kumaki et al. |
| 6,510,153 | B1 | 1/2003 | Inoue et al. |
| 6,512,754 | B2 | 1/2003 | Feder et al. |
| 6,515,974 | B1 | 2/2003 | Inoue et al. |
| 6,549,522 | B1 | 4/2003 | Flynn |
| 6,567,664 | B1 | 5/2003 | Bergenwall et al. |
| 6,571,289 | B1 | 5/2003 | Montenegro |
| 6,606,316 | B1 | 8/2003 | Albert et al. |
| 6,618,596 | B1 | 9/2003 | Uchida |
| 6,625,135 | B1 | 9/2003 | Johnson et al. |
| 6,629,137 | B1 | 9/2003 | Wynn |
| 6,636,498 | B1 | 10/2003 | Leung |
| 6,731,621 | B1 | 5/2004 | Mizutani et al. |
| 6,738,362 | B1 | 5/2004 | Xu et al. |
| 6,747,961 | B1 | 6/2004 | Ahmed et al. |
| 6,766,168 | B1 | 7/2004 | Lim |
| 6,829,486 | B2 | 12/2004 | McKenna et al. |
| 6,959,341 | B1 | 10/2005 | Leung |
| 7,151,758 | B2 | 12/2006 | Kumaki et al. |
| 7,203,517 | B2 | 4/2007 | Shimoda et al. |
| 2001/0032262 | A1 | 10/2001 | Sundqvist et al. |
| 2002/0075878 | A1 | 6/2002 | Lee et al. |
| 2002/0186693 | A1 | 12/2002 | Inoue et al. |
| 2003/0076852 | A1 | 4/2003 | Fukui |
| 2003/0117965 | A1 | 6/2003 | Markki et al. |
| 2004/0057384 | A1 | 3/2004 | Le et al. |
| 2004/0095913 | A1 | 5/2004 | Westphal |
| 2004/0156374 | A1 | 8/2004 | Lee et al. |
| 2004/0236937 | A1 | 11/2004 | Perkins et al. |
| 2005/0148378 | A1 | 7/2005 | Fasbender et al. |
| 2005/0175002 | A1 | 8/2005 | Le et al. |
| 2005/0185612 | A1 | 8/2005 | He |
| 2006/0256762 | A1 | 11/2006 | Patel et al. |
| 2007/0047507 | A1* | 3/2007 | Nakatsugawa et al. ...... 370/338 |

FOREIGN PATENT DOCUMENTS

| | | |
|---|---|---|
| WO | WO 03/043226 | 5/2003 |

OTHER PUBLICATIONS

J. Moy, RFC 1247 "*OSPF Version 2*", Jul. 19, 1991.

D. Oran, RFC 1142 "*OSI IS-IS Intra-Domain Routing Protocol*", Feb. 1990 (142 pgs.).

Uyless Black, "TCP/IP and Related Protocols," 1992 *McGraw-Hill, Inc.*, pp. 226-249.

T. Li et al., RFC 2281 "Cisco Hot Standby Router Protocol (HSRP)," Mar. 1998.

Chambless et al., "Home Agent Redundancy Protocol (HARP)," Oct. 27, 1997.

C. Perkins, "*IP Mobility Support*," RFC 2002, IBM Corporation, Oct. 1996.

"*Mobile IP*," Release 12.0(1)T, pp. 1-55.

Montenegro, G., "*Reverse Tunneling for Mobile IP*," RFC 2344, Sun Microsystems, Inc., pp. 1-19, May 1998.

D. Harkins and D. Carrel, "The Internet Key Exchange (IKE)," Cisco Systems, pp. 1- 33, Jun. 1998.

D. Cong, M. Hamlen, and C. Perkins, "*The Definitions of Managed Objects for IP Mobility Support using SMIv2*," RFC 2006 Motorola and IBM, pp. 1-52, Oct. 1996.

C. Finseth, "*An Access Control Protocol, Sometimes Called TACACS*", RFC 1492, pp. 1-15, Sep. 13, 1992.

D. Carrel and Lol Grant, "*The TACACS+ Protocol*", Network Working Group, Internet-Draft, Cisco Systems, pp. 1-42, Jan. 1997.

Rigney, "*RADIUS Accounting*", RFC 2139, Livingston, pp. 1-25, Apr. 1997.

C. Rigney et al., "*Remote Authentication Dial in User Service (RADIUS)*", RFC 2138, pp. 1-65, Apr. 1997.

Transport Mode, Microsoft TechNet (pp. 13 and 15); updated Jan. 21, 2005.

D. Johnson et al., "*Mobility Support in IPv6*," RFC 3775, Jun. 2004, 129 pages.

J. Arkko et al., "*Using Ipsec to Protect Mobile Ipv6 Signaling Between Mobile Nodes and Home Agents*," RFC 3776, Jun. 2004, 32 pages.

A. Patel et al., "*Methods and Apparatus for Achieving Route Optimization Between Mobile Networks and a Correspondent Node using a Mobile Router as a Proxy Node*," U.S. Appl. No. 10/874,650, filed Jun. 22 2004 (CISCP371).

A. Patel et al., "*Methods and Apparatus for Achieving Route Optimization and Location Privacy in an Ipv6 Network*," U.S. Appl. No. 10/898,579 filed on Jul. 23, 2004 (CISCP370).

Anpalagan, Alagan S. et al.: "Overlaid Cellular System Design with Cell Selection Criteria for Mobile Wireless Users" Electrical and Computer Engineering, 1999, IEEE Canadian Conference in Edmonton, Alberta, Canada May 9-12, 1999, Piscataway, NJ USA, IEEE, US, vol. 1, May 9, 1999, ISBN: 0-7803-5579-2, pp. 24-28.

International Search Report dated Jan. 20, 2005 from related PCT Application No. PCT/US2004/034785 (CISCP358WO).

Written Opinion of the International Searching Authority dated Jan. 20, 2005 from related PCT Application No. PCT/US2004/034785 (CISCP358WO).

Examiner's Communication pursuant to Article 96(2) EPC dated Oct. 25, 2006 from related European Application No. 04 795 886.3, 4 pp. (CISCP358EP).

Examiner's Communication pursuant to Article 96(2) EPC dated Aug. 1, 2007, from related European Application No. 04 795 886.3, (CISCP258EP).

C. Perkins, Ed. "*IP Mobility Support for Ipv4*," Network Working Group, Nokia Research Center, Aug. 2002 RFC 3344.

* cited by examiner

Table maintained by Mobile Router 1702

| MNN1->CN1 1704 | Small 1706 | TCP sequence/ACK #s 1708 |
|---|---|---|
| MNN1->CN1 | Large | |
| | | |
| | | |

FIG. 7E

Table maintained by Home Agent 1710

| MNN1->CN1 1712 | MR1 1714 | Small 1716 | TCP sequence/ACK #s 1718 |
|---|---|---|---|
| MNN1->CN1 | MR | Large | |
| | | | |
| | | | |

FIG. 7F

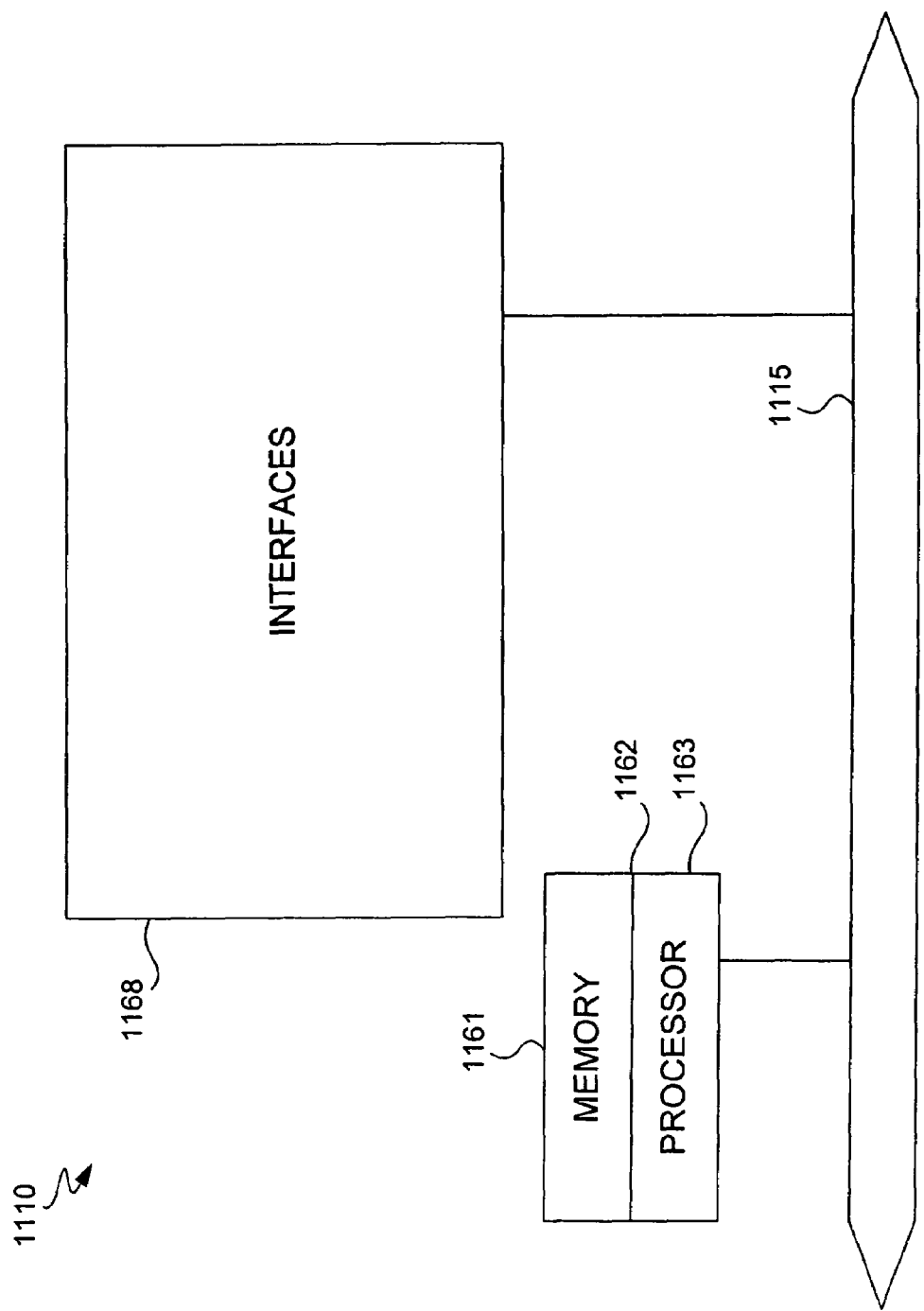

MOBILE NETWORK DEVICE MULTI-LINK OPTIMIZATIONS

BACKGROUND OF THE INVENTION

The present invention relates to Mobile IP network technology. More particularly, the present invention relates to providing optimizations for a mobile network device (e.g., Mobile Node or Mobile Router) that supports multiple links between the mobile network device and a Home Agent (or Correspondent Node in a Mobile IPv6 environment).

Mobile IP is a protocol which allows laptop computers or other mobile computer units (referred to as "Mobile Nodes" herein) to roam between various sub-networks at various locations—while maintaining internet and/or WAN connectivity. Without Mobile IP or a related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one sub-network and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 3344 of the Network Working Group, C. Perkins, Ed., "IP Mobility Support for IPv4," August 2002. Mobile IP is also described in the text "Mobile IP Unplugged" by J. Solomon, Prentice Hall. Both of these references are incorporated herein by reference in their entireties and for all purposes.

The Mobile IP process in a Mobile IPv4 environment are illustrated in FIG. 1. As shown there, a Mobile IP environment 2 includes the internet (or a WAN) 4 over which a Mobile Node 6 can communicate remotely via mediation by a Home Agent 8 and may also include a Foreign Agent 10. In a Third Generation Partnership Project 2 (3GPP2)/CDMA2000 network, the Foreign Agent is implemented in what is generally referred to as a Packet Data Serving Node (PDSN). In the absence of a Foreign Agent in a Mobile IPv4 environment, or in a Mobile IPv6 environment in which a Foreign Agent is not implemented, the Mobile Node 6 can obtain a topologically correct IP address (i.e., collocated IP address) and register this IP address with the Home Agent. (In a Mobile IPv6 environment, this is accomplished via an Access Router rather than a Foreign Agent.) Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a Correspondent Node 18 from its new location. In Mobile IPv4, a message from the Mobile Node is then packetized and forwarded through Foreign Agent 10 over the internet 4 and to Correspondent Node 18 (as indicated by the dotted line "packet from MN") according to a standard internet protocol. If Correspondent Node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from Correspondent Node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling." In the absence of a Foreign Agent, packets are tunneled directly to the Mobile Node 6 collocated care-of address.

In addition to providing connectivity to a mobile node, it may be desirable to provide for the mobility of one or more networks moving together, such as on an airplane or a ship. RFC 2002 section 4.5 discusses the possibility of implementing mobile routers. One method for implementing a Mobile Router is described in U.S. patent application Ser. No. 09/227,396, entitled "Mobile IP Router," by Kent Leung, filed on Jan. 8, 1999, which is incorporated herein by reference for all purposes.

As set forth above, when a mobile network device such as a Mobile Node or Mobile Router successfully registers with its Home Agent, a tunnel connecting the mobile network device and the Home Agent is generated. Recently, multiple tunnel functionality is supported. More particularly, a mobile network device such as a Mobile Node or a Mobile Router supports multiple tunnels between the mobile network device and its Home Agent.

The number of tunnels between the mobile network device and the Home Agent may vary depending upon the type of interfaces available to the mobile network device and the wireless coverage for these interface types. Some examples of access technologies include Cellular Digital Packet Data (CDPD), CDMA2000 (1xRTT, EVDO etc), 802.11, UMTS etc. These various radio interfaces have varying layer 2 link characteristics (varying delays, error rates etc), as well as different link Maximum Transmission Unit (MTU). The MTU is the largest size packet that can be transmitted on the link.

As the mobile network device roams, the number of access links and the type of access links that are available will vary. As a result, the bandwidth between the mobile network device and the Foreign Agent/Access router (effectively between the mobile network device and Home Agent) may change. When the bandwidth between a Mobile Node and its Home Agent changes drastically, the applications running on the Mobile Node may experience an abrupt change in end-to-end link characteristics. Similarly, when the bandwidth between a Mobile Router and its Home Agent changes drastically, the applications running on a client/mobile network node (MNN) connected to the Mobile Router may experience an abrupt change in end-to-end link characteristics. While the transport layer of the client (e.g., Mobile Node or MNN) will determine the end-to-end link characteristics and adjust accordingly, this adjustment takes time. Moreover, since the Mobile Node/Router is typically moving, such frequent adjustments will degrade application performance.

In view of the above, it is desirable to reduce the effects of sudden changes in bandwidth for an end application running on the client for a smoother user experience.

SUMMARY OF THE INVENTION

Methods and apparatus for performing optimizations for a mobile network device such as a Mobile Node or Mobile Router supporting multiple links to a Home Agent (or Correspondent Node in a Mobile IPv6 environment) are disclosed. Some optimizations may be performed when the mobile network device has roamed from a high to a low bandwidth link, while other optimizations may be performed when the mobile network device has roamed from a low to a high bandwidth link. Moreover, some optimizations may be performed during the establishment of a TCP session, while others may be performed during or upon completion of the Mobile IP registration process.

In accordance with one aspect of the invention, link characteristics are transmitted in a registration request. A registration request is termed a "Binding Update" in a Mobile IPv6 environment. From the link characteristics, it is possible to determine whether the mobile network device has roamed from a high to a low bandwidth link, or vice versa. More particularly, the link characteristics associated with a previous session may be obtained from a table, enabling the link characteristics associated with the previous session to be compared to the link characteristics associated with the current session.

In accordance with another aspect of the invention, Maximum Transfer Units (MTUs) may be optimized by a Mobile Router during TCP session setup. Specifically, the Mobile Router may modify the Maximum Segment Size (MSS) of a TCP SYN packet transmitted by a mobile network node coupled to the Mobile Router to a Correspondent Node. Similarly, the Mobile Router may modify the MSS of a TCP SYN ACK packet transmitted by a Correspondent Node to the mobile network node. For instance, the Mobile Router may change the MSS to the lowest MTU of all of the links available to it, or alternatively, all of the links that are "up."

In accordance with another aspect of the invention, optimization is performed when a mobile network device such as a Mobile Node or Mobile Router moves from a low to a high bandwidth link. In this instance, the Home Agent may resend a TCP ACK transmitted by a mobile network node coupled to a Mobile Router (or transmitted by a Mobile Node) to a Correspondent Node multiple times with different sequence numbers. Similarly, a Mobile Router may resend a TCP ACK transmitted by the Correspondent Node to a mobile network node coupled to the Mobile Router multiple times with different sequence numbers.

In accordance with another aspect of the invention, optimization is performed when a mobile network device such as a Mobile Node or Mobile Router moves from a high to a low bandwidth link. In accordance with one embodiment, the Home Agent may send an ICMP source quench message to the Correspondent Node "on behalf of" the node communicating with the Correspondent Node (e.g., mobile network node coupled to a Mobile Router, or a Mobile Node). A Mobile Router may similarly send an ICMP source quench message to mobile network nodes coupled to the Mobile Router "on behalf of" the Correspondent Node.

In accordance with another embodiment, when the mobile network device moves from a high to a low bandwidth link, the Home Agent may send a message indicating that the TCP window size is zero to the Correspondent Node "on behalf of" the node communicating with the Correspondent Node (e.g., mobile network node coupled to a Mobile Router, or a Mobile Node). A Mobile Router may similarly send a message indicating that the window size is zero to mobile network nodes coupled to the Mobile Router "on behalf of" the Correspondent Node.

In accordance with yet another embodiment, when the mobile network device moves from a high to a low bandwidth link, the Home Agent may resend a TCP ACK transmitted by a mobile network node coupled to a Mobile Router (or transmitted by a Mobile Node) to a Correspondent Node multiple times with the same sequence number. Similarly, a Mobile Router may resend a TCP ACK transmitted by the Correspondent Node to a mobile network node coupled to the Mobile Router multiple times with the same sequence number.

In accordance with yet another embodiment, when the mobile network device moves from a high to a low bandwidth link, the Home Agent may filter low priority traffic. Similarly, a Mobile Router may filter low priority traffic that is transmitted to mobile network nodes coupled to the Mobile Router.

In some instances, it is possible for a mobile network device to register itself directly with a Correspondent Node. This may be possible, for example, in a Mobile IPv6 environment. When the mobile network device roams from a high to a low bandwidth link, the Correspondent Node may initiate the measures set forth above that are performed by the Home Agent.

In accordance with another aspect of the invention, the invention pertains to a system operable to perform and/or initiate any of the disclosed methods in a mobile network device (e.g., Mobile Node or Mobile Router), Home Agent, or Correspondent Node. The system includes one or more processors and one or more memories. At least one of the memories and processors are adapted to provide at least some of the above described method operations. In yet a further embodiment, the invention pertains to a computer program product for performing the disclosed methods. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures, which illustrate by way of example the principles of the invention.

BRIEF DESCRIPTION OF THE DRAWINGS

FIG. 7E is an exemplary table that may be maintained by a mobile network device such as a Mobile Router in accordance with various embodiments of the invention.

FIG. 7F is an exemplary table that may be maintained by a Home Agent in accordance with various embodiments of the invention.

FIG. 9 is a diagrammatic representation of a router in which embodiments of the present invention may be implemented.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The disclosed embodiments support optimizations that may be performed for a mobile network device such as a Mobile Node or a Mobile Router that supports multiple tunnels. When a mobile network device roams from a low bandwidth link to a high bandwidth link, it generally takes a significant amount of time for end hosts to notice that a higher bandwidth is supported. As a result, the end hosts typically fail to utilize the increase in bandwidth properly. Similarly, when a mobile network device roams from a high bandwidth link to a low bandwidth link, traffic will continue to be transmitted at a rate assuming a high bandwidth. Unfortunately, this results in dropped packets, and therefore unreliable transmissions. The disclosed embodiments support a variety of optimizations to prevent such undesirable characteristics.

In accordance with various embodiments of the invention, a mobile network device is configured to support Mobile IP. In various embodiments, the mobile network device and other devices (e.g., Home Agent, any Foreign Agents, and Correspondent Node) are configured to support Mobile IPv4, while in other embodiments, the mobile network device and other devices are configured to support Mobile IPv6. However, it is important to note that the disclosed embodiments may be implemented in other versions of Mobile IP.

Figure 1:
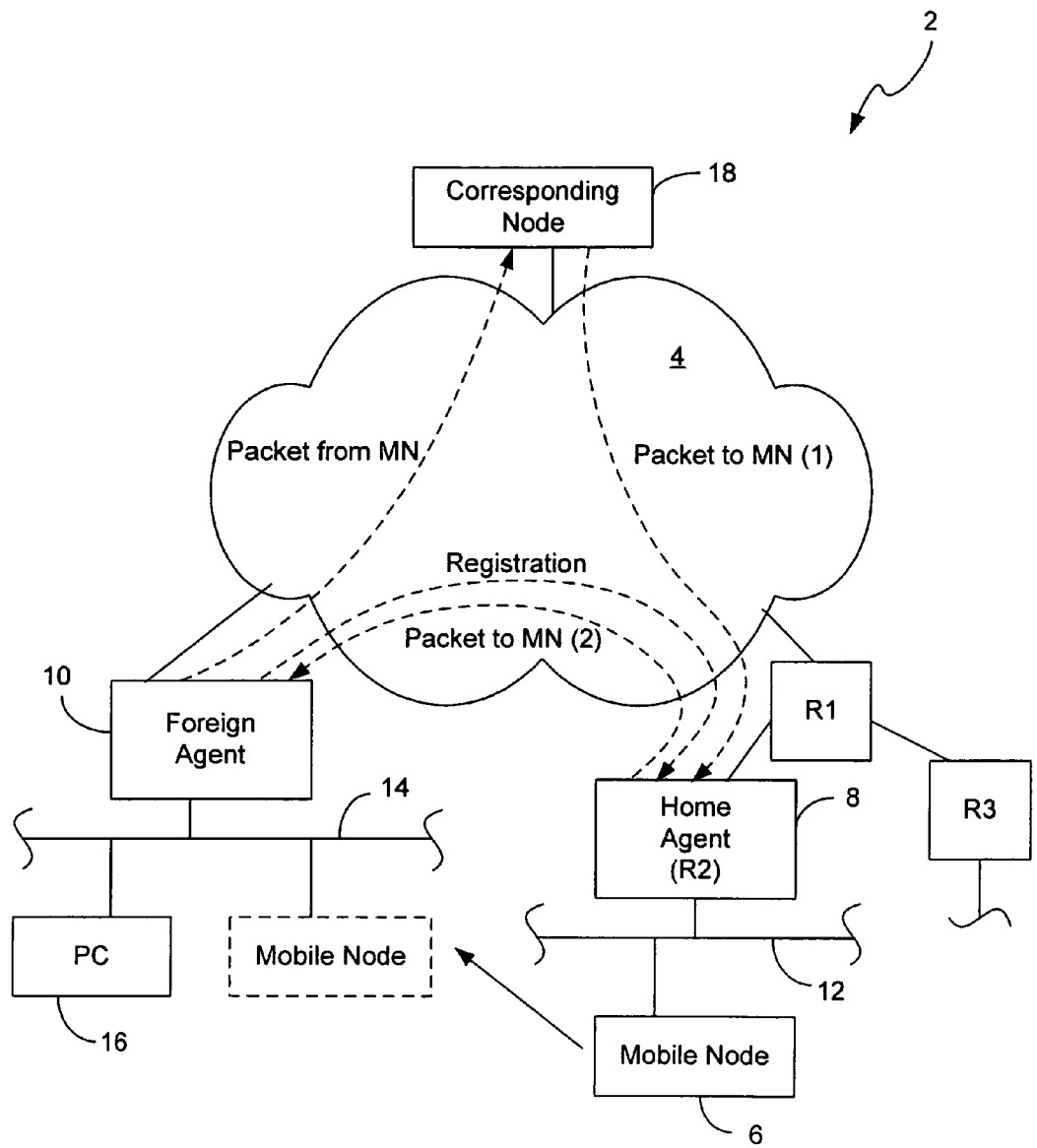
FIG. 1 is a diagram of a Mobile IP network segment and associated environment.
Figure 2A:
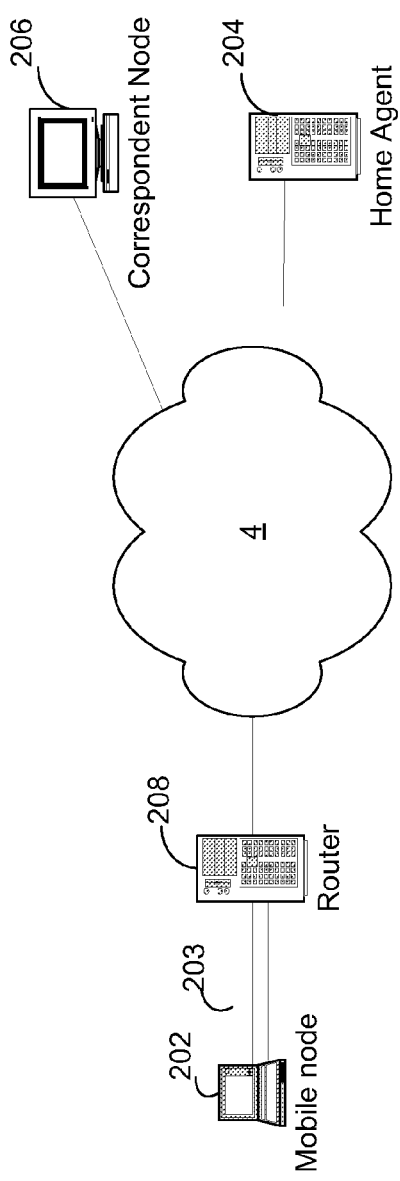
FIG. 2A is a diagram illustrating a typical network including a Mobile Node that supports multiple tunnels.
Figure 2B:
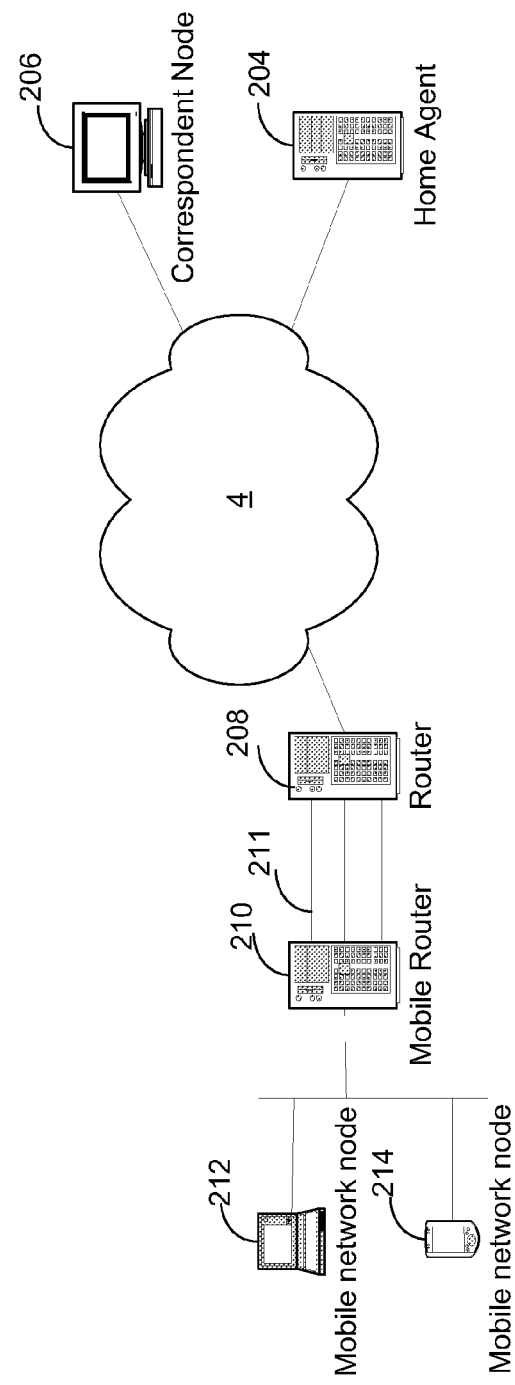
FIG. 2B is a diagram illustrating a typical network including a Mobile Router that supports multiple tunnels.

FIGS. 2A and 2B together illustrate a mobile network device that supports multiple tunnels. More particularly, FIG. 2A illustrates a Mobile Node, while FIG. 2B illustrates a Mobile Router.

FIG. 2A is a diagram illustrating a typical network including a Mobile Node that supports multiple tunnels. As shown in FIG. 2A, a Mobile Node 202 supports multiple tunnels 203 between the Mobile Node and Home Agent 204 (or Correspondent Node in a Mobile IPv6 environment supporting route optimization). Packets transmitted between the Mobile Node 202 and a Correspondent Node 206 may be transmitted via any of these tunnels 204. The Mobile Node 202 is configured with hardware and/or software to enable the Mobile Node 202 to roam among various locations. As shown in FIG. 2A, packets may be transmitted to and from the Mobile Node 202 via a router 208.

Similarly, FIG. 2B is a diagram illustrating a typical network including a Mobile Router that supports multiple tunnels. In this example, a Mobile Router 210 supports multiple tunnels 211 between the Mobile Router 210 and Home Agent 204 (or Correspondent Node in a Mobile IPv6 environment supporting route optimization). Packets transmitted between a node 212 or 214 coupled to the Mobile Router 210 and a Correspondent Node 206 may be transmitted via any of the tunnels 211. It is important to note although two nodes 212 and 214 are illustrated, the Mobile Router 210 may support any number of nodes. While the Mobile Router 210 is configured with hardware and/or software to enable the Mobile Router 210 to roam from one location to another, the node(s) 212, 214 need not include such hardware and/or software. Such a node may be referred to as a mobile network node (MNN).

Once Mobile IP registration has been successfully performed by the Mobile Router 210, a TCP session is established between a node 212 or 214 and the Correspondent Node 206. When the node 212 or 214 sends a TCP SYN packet, it includes a Maximum Segment Size (MSS) field, which typically includes the link Maximum Transmission Units (MTU) of the sending node (e.g., node 212 or 214). However, in reality, the Mobile Router's access link (i.e., uplink) MTU can vary. If the uplink has a lower MTU than the link MTU of the node 212 or 214, the Mobile Router 210 may be forced to fragment packets, resulting in wasted CPU performance on the Mobile Router and the end host receiving the fragmented packets.

In accordance with one embodiment, the Mobile Router 210 may change the MSS of a TCP packet. More particularly, the Mobile Router 210 may change the MSS of a TCP SYN packet received from a node 212 or 214 coupled to the Mobile Router 210 en route to a Correspondent Node 206. Similarly, the Mobile Router 210 may change the MSS of a TCP SYN ACK packet en route from the Correspondent Node 206. One method for performing such TCP processing by a Mobile Router will be described in further detail below with reference to FIG. 3 and FIGS. 4A-4C.

Figure 3:
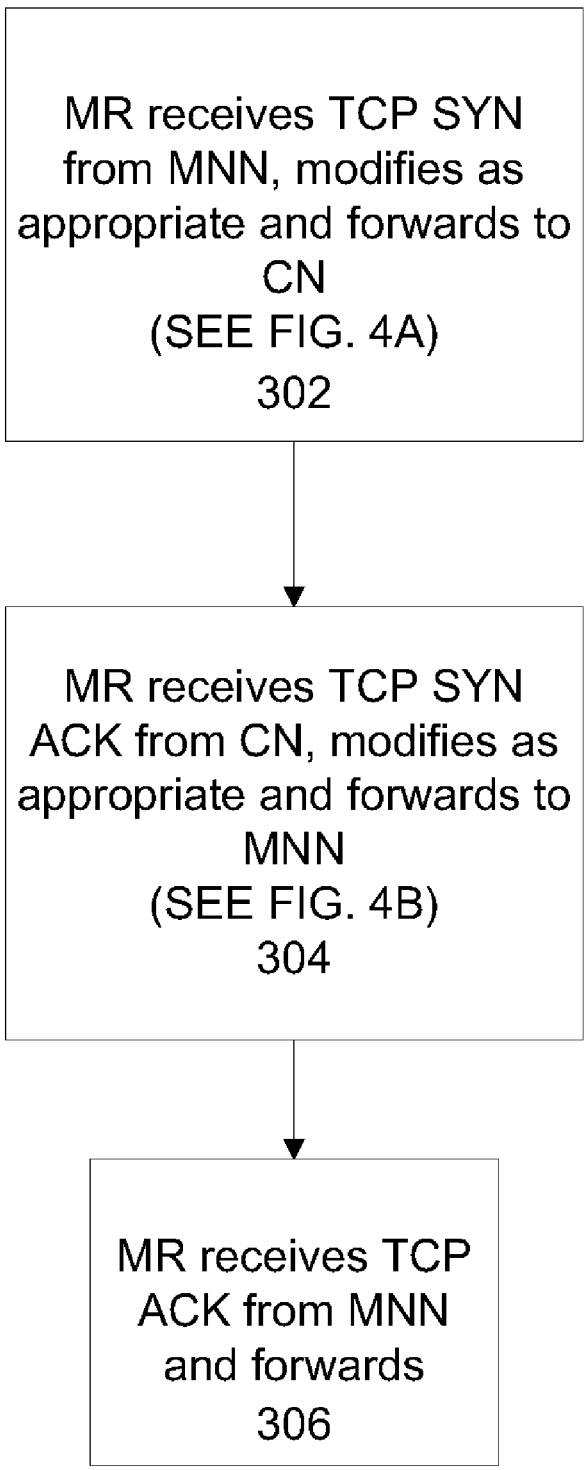
FIG. 3 is a process flow diagram illustrating a method of performing optimization of Maximum Transmission Units (MTUs) by a Mobile Router during TCP session setup in accordance with a first embodiment of the invention.

FIG. 3 is a process flow diagram illustrating a method of performing optimization of Maximum Transmission Units (MTUs) by a Mobile Router during TCP session setup in accordance with one embodiment of the invention. In order to establish a TCP session with a Correspondent Node, a node coupled to a Mobile Router typically sends a TCP SYN packet addressed to the Correspondent Node. As set forth above, the TCP SYN packet typically has a MSS field indicating a link MTU of the node. More particularly, the MSS field typically includes the link MTU of the node less the header overhead (e.g., bytes required for the IP and TCP headers), which is typically 60 bytes. When the Mobile Router intercepts or receives the TCP SYN packet at 302, it modifies the MSS field of the TCP SYN packet as appropriate and forwards it to the Correspondent Node. One method of modifying a TCP SYN packet will be described in further detail below with reference to FIG. 4A.

Similarly, when the Correspondent Node transmits a TCP SYN ACK packet to the node, the TCP SYN ACK packet typically has a MSS field including a link MTU of the Correspondent Node. When the Mobile Router intercepts or receives the TCP SYN ACK packet at 304, it modifies the MSS field of the TCP SYN ACK packet as appropriate and forwards it to the node coupled to the Mobile Router. One method of modifying a TCP SYN ACK packet will be described in further detail below with reference to FIG. 4B.

Upon receiving the TCP SYN ACK, the node sends a TCP ACK packet. When the Mobile Router receives the TCP ACK packet at 306, it forwards the TCP ACK packet to the Correspondent Node.

Figure 4A:
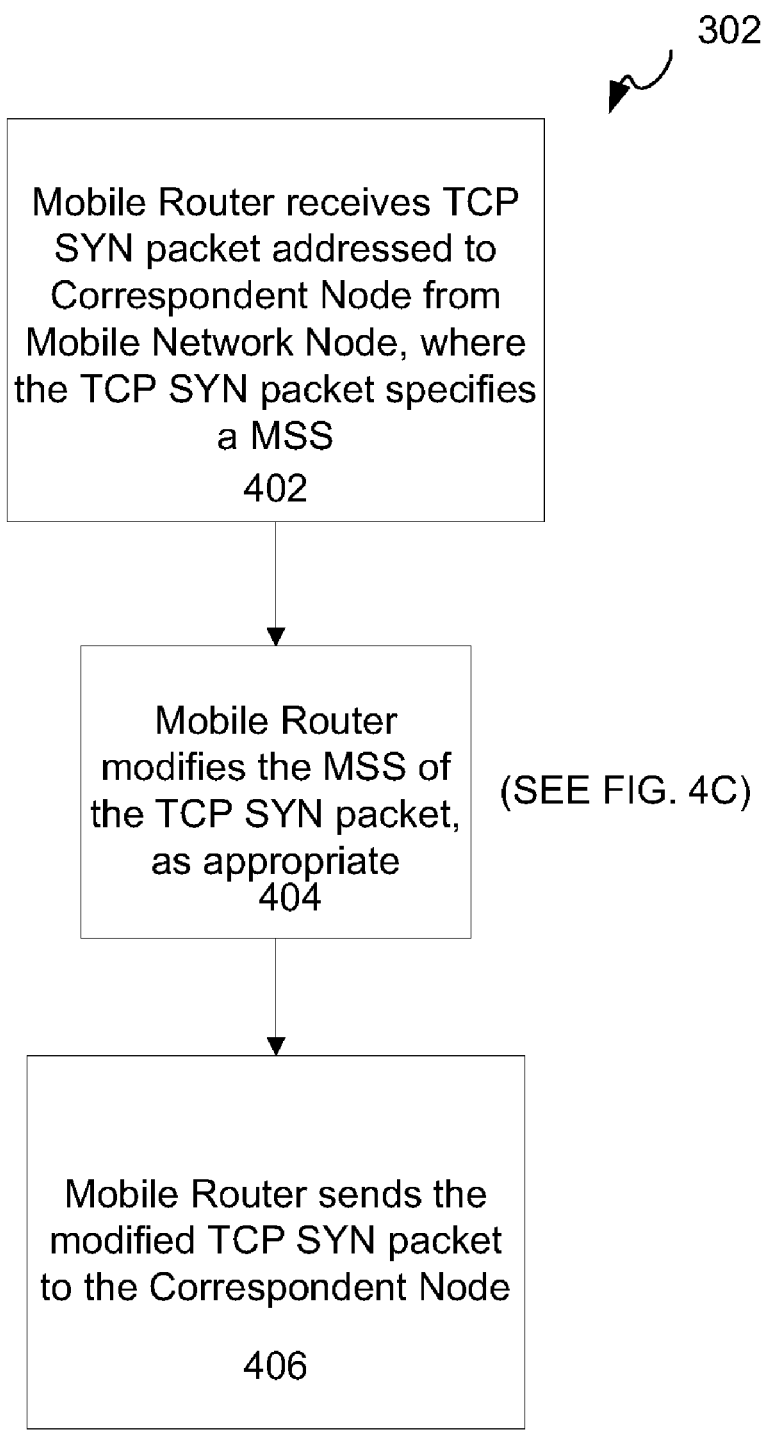
FIG. 4A is a process flow diagram illustrating a method of modifying a TCP SYN packet received from a mobile network node (MNN) as shown at 302 of FIG. 3.

FIG. 4A is a process flow diagram illustrating a method of modifying a TCP SYN packet received from a mobile network node (MNN) as shown at 302 of FIG. 3. As shown at 402, the Mobile Router receives a TCP SYN packet addressed to a Correspondent Node from a node, where the TCP SYN packet specifies a MSS. The Mobile Router modifies the MSS of the TCP SYN packet, as appropriate, at 404. One method of modifying the MSS of the TCP SYN packet will be described in further detail below with reference to FIG. 4C. The Mobile Router then sends the modified TCP SYN packet to the Correspondent Node at 406.

Figure 4B:
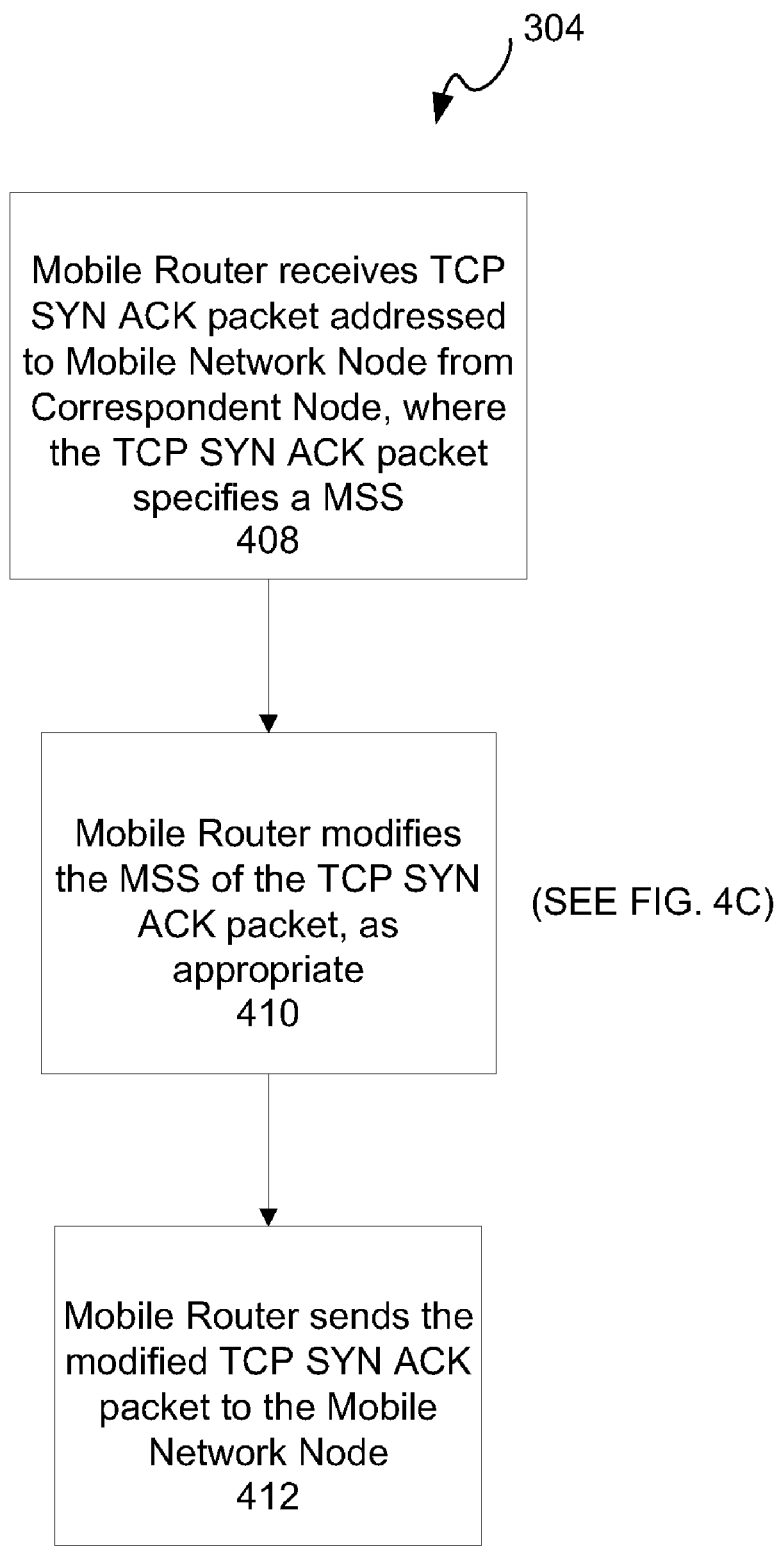
FIG. 4B is a process flow diagram illustrating a method of modifying a TCP SYN ACK packet received from a Correspondent Node (CN) as shown at 304 of FIG. 3.

FIG. 4B is a process flow diagram illustrating a method of modifying a TCP SYN ACK packet received from a Correspondent Node (CN) as shown at 304 of FIG. 3. As shown at 408, the Mobile Router receives a TCP SYN ACK packet addressed to the node, where the TCP SYN ACK packet specifies a MSS. The Mobile Router modifies the MSS of the TCP SYN ACK packet, as appropriate, at 410. One method of modifying the MSS of the TCP SYN ACK packet will be described in further detail below with reference to FIG. 4C. The Mobile Router then sends the modified TCP SYN ACK packet to the node at 412.

Figure 4C:
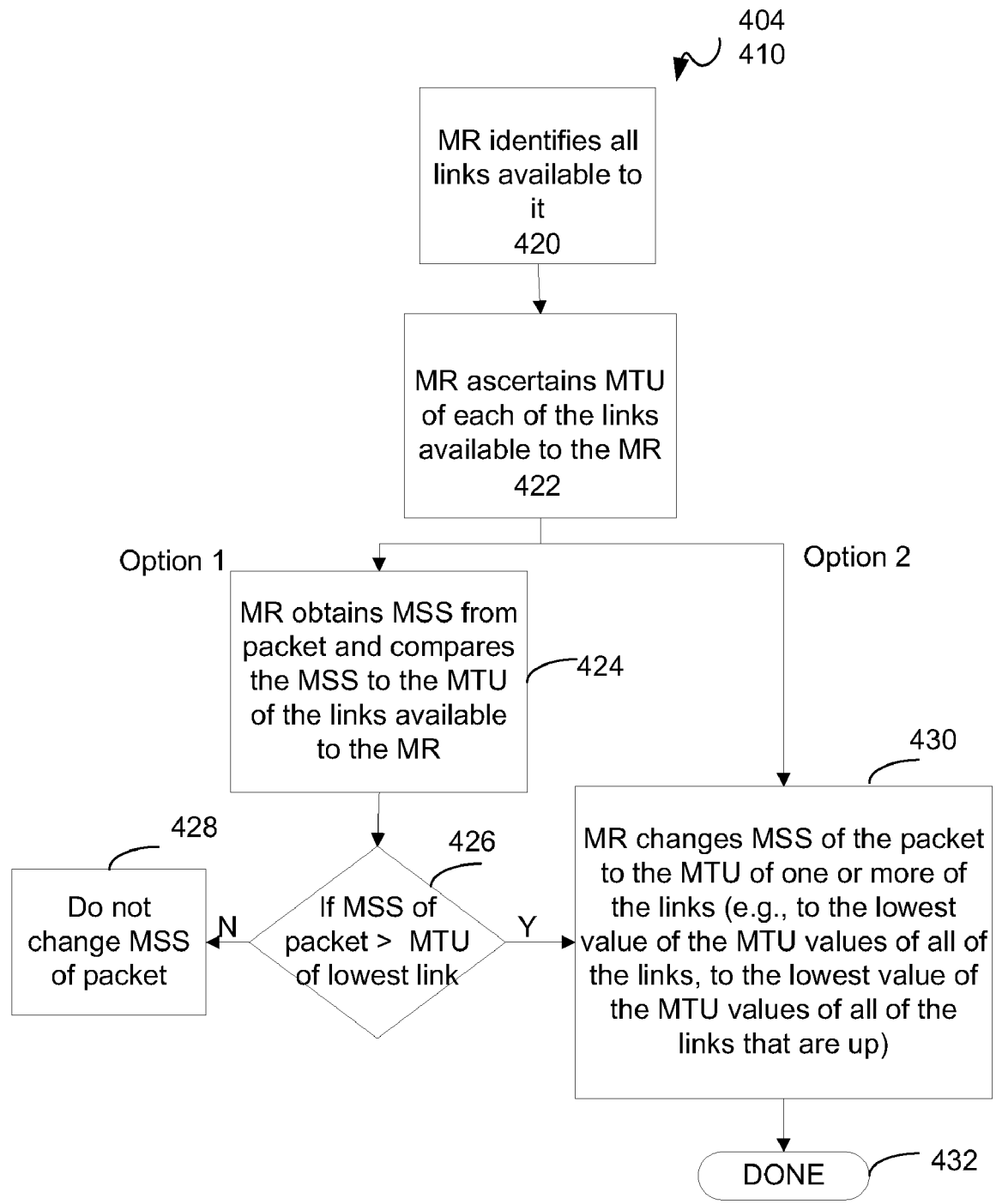
FIG. 4C is a process flow diagram illustrating a method of modifying the Maximum Segment Size (MSS) of a TCP packet as shown at block 404 of FIG. 4A and block 410 of FIG. 4B.

As described above with reference to FIGS. 4A and 4B, the Mobile Router may modify the MSS of a TCP SYN packet and/or a TCP SYN ACK packet. FIG. 4C is a process flow diagram illustrating a method of modifying the MSS of a TCP packet as shown at block 404 of FIG. 4A and block 410 of FIG. 4B. As shown at 420, the Mobile Router may identify all links available to it. The Mobile Router may therefore ascertain a MTU of each of a plurality of links available to the Mobile Router at 422. From this information, the Mobile Router may modify the MSS of the TCP packet to the MTU of one of the links.

In accordance with one embodiment, the Mobile Router may obtain the MSS from the TCP packet (e.g., TCP SYN or TCP SYN ACK) and compare the MSS to the MTU of the links available to the Mobile Router at 424. From this comparison, the Mobile Router may determine whether the MSS of the TCP SYN packet is greater than a MTU of one of the plurality of links (e.g., the lowest MTU value) at 426. If the MSS of the packet is not greater than the lowest MTU value of the links available to the Mobile Router, the Mobile Router does not change the MSS of the TCP packet at 428. However, if the MSS of the packet is greater than the MTU of the lowest link, the Mobile Router changes the MSS of the TCP packet to the MTU of at least one of the links at 430. In this example, the Mobile Router changes the MSS of the TCP packet to the lowest MTU of the links available to the Mobile Router. Alternatively, the Mobile Router may change the MSS of the TCP packet to the lowest MTU of the links that are up (e.g., connected and functional).

In accordance with another embodiment, the Mobile Router need not compare the MSS of the TCP packet with the MTU of the links. Rather, the Mobile Router simply automatically modifies the MSS of the TCP packet to that of one of the links. For instance, as set forth above, the Mobile Router may modify the MSS of the TCP packet to the lowest MTU of the links that are available or, alternatively, the lowest MTU of the links that are up. The process ends at 432.

Once Mobile IP registration is completed, a TCP session may be established to support communication between two nodes. In some embodiments, standard TCP processing steps are modified to optimize transmissions in situations in which multiple links are available. For instance, TCP processing may be modified when the mobile network device (e.g., Mobile Router) moves from a low bandwidth link to a high bandwidth link. As another example, TCP processing may be modified when the mobile network device moves from a high bandwidth link to a low bandwidth link. In order to illustrate those changes made to standard TCP processing steps, an example illustrating standard TCP processing will be described with reference to FIG. 5.

Figure 5:
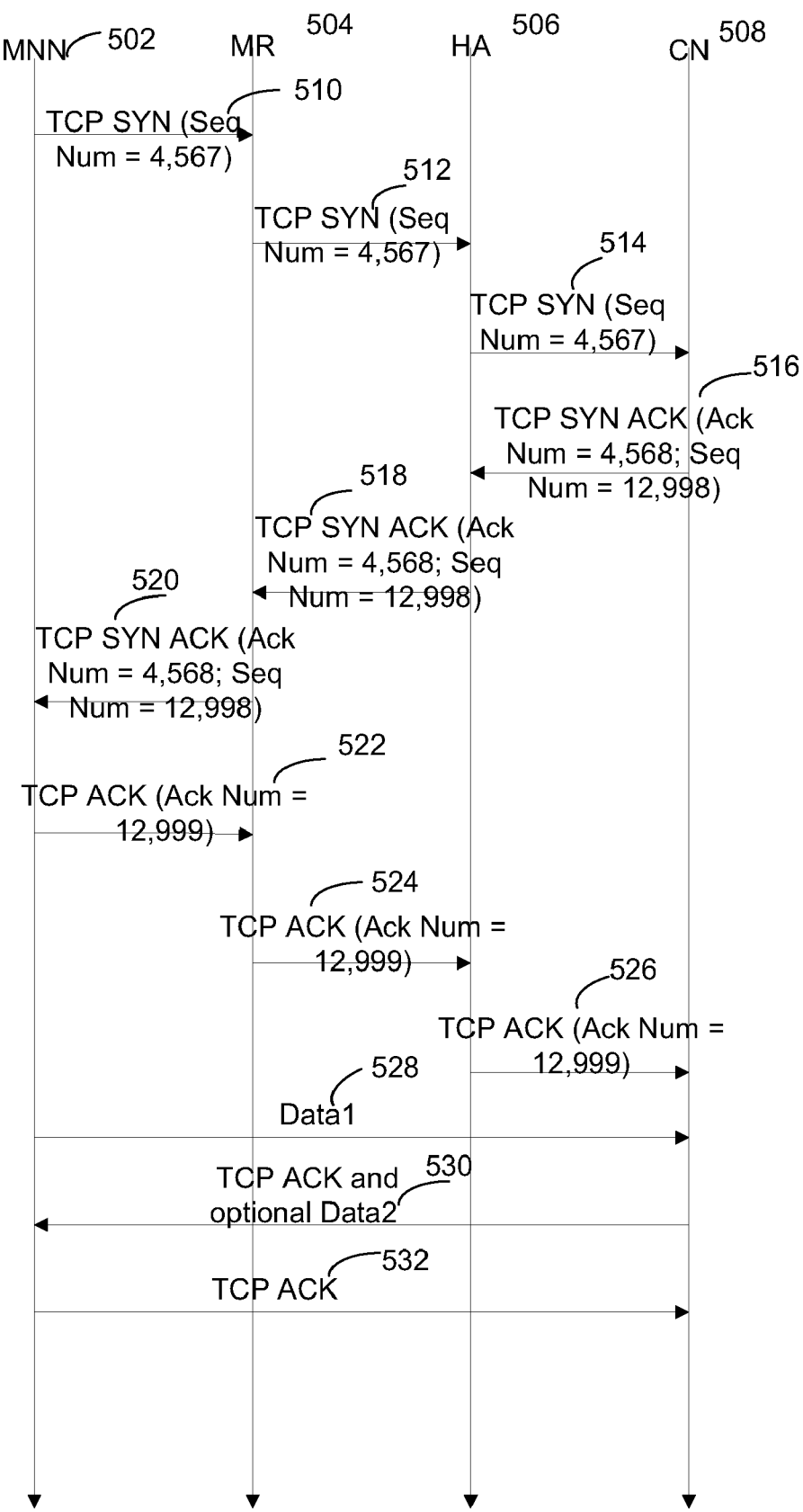
FIG. 5 is a transaction flow diagram illustrating a method of performing TCP processing.

FIG. 5 is a transaction flow diagram illustrating a method of performing TCP processing in a system including a Mobile Router. Steps performed by a mobile network node (MNN), Mobile Router (MR), Home Agent (HA), and Correspondent Node (CN) are illustrated with respect to vertical lines 502, 504, 506, and 508, respectively. When a client requests a connection, it sends a TCP SYN with a Sequence Number field including a sequence number at 510. The sequence number is typically the Initial Sequence Number (ISN) of the mobile network node. In this example, the sequence number provided by the MNN is 4,567. The MR typically forwards the TCP SYN with its original sequence number at 512. The Home Agent then forwards the TCP SYN to the Correspondent Node at 514.

When the Correspondent Node receives the TCP SYN, the Correspondent Node obtains the sequence number from the TCP SYN and sends a TCP SYN ACK at 516 with an Acknowledgement Number field value that is one more than the sequence number of the TCP SYN. In this example, the Acknowledgement Number field value is 4,568. In addition, the TCP SYN ACK includes a Sequence Number field. The Sequence Number field includes a sequence number provided by the Correspondent Node. The sequence number is typically the ISN of the Correspondent Node. The Home Agent forwards the TCP SYN ACK to the Mobile Router at 518. The Mobile Router then forwards the TCP SYN ACK to the mobile network node at 520.

When the mobile network node receives the TCP SYN ACK, it obtains the Sequence Number from the TCP SYN ACK. In this example, the sequence number is 12,998. The mobile network node increments the sequence number to generate an Acknowledgement Number, 12,999. The mobile network node composes a TCP ACK including the Acknowledgement Number and transmits the TCP ACK at 522 to the Mobile Router. The Mobile Router intercepts the TCP ACK and forwards the TCP ACK to the Home Agent at 524. The Home Agent then forwards the TCP ACK to the Correspondent Node at 526. While this example relates to a Mobile Router, it is important to note that the Sequence Numbers and Acknowledgement Numbers are transmitted in a similar fashion in a system including a mobile network device such as a Mobile Node.

Of course, once the TCP session has been established, the mobile network node may send data, Data1, to the Correspondent Node at 528. Upon receipt of the data, the Correspondent Node acknowledges the data by sending a TCP ACK at 530, which may be transmitted with data, Data2. The mobile network node may then acknowledge any data transmitted by the Correspondent Node by sending a TCP ACK at 532 to the Correspondent Node.

In the examples set forth herein, the mobile network node initiates the TCP session. However, it is important to note that these examples are merely illustrative. Accordingly, the Correspondent Node may also initiate the TCP session.

Figure 6:
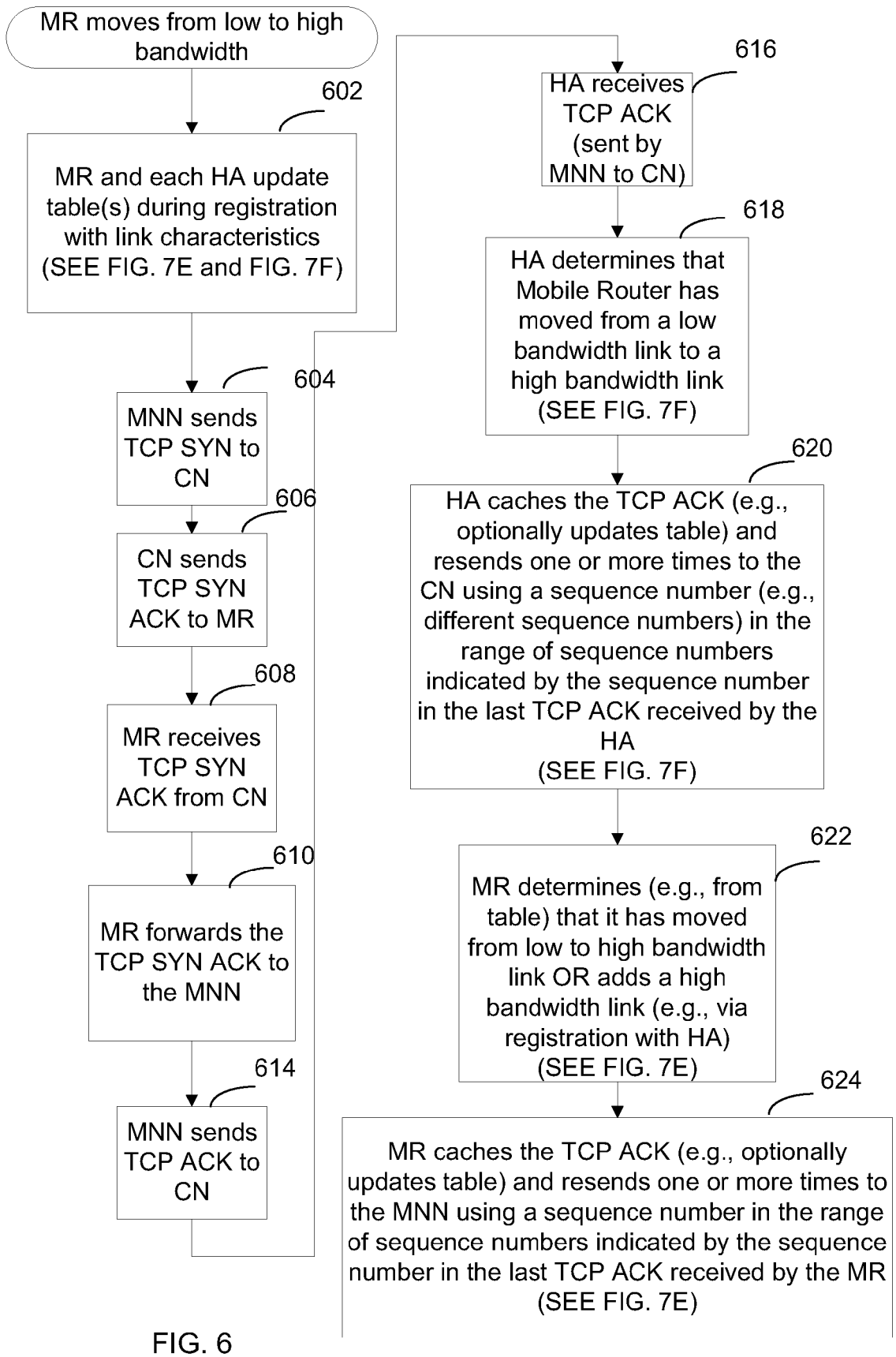
FIG. 6 is a process flow diagram illustrating a method of establishing a TCP session when a Mobile Router moves from a low bandwidth link to a high bandwidth link in accordance with a second embodiment of the invention.

FIG. 6 is a process flow diagram illustrating a method of establishing a TCP session when a mobile network device such as a Mobile Router moves from a low bandwidth link to a high bandwidth link in accordance with a second embodiment of the invention. As will be described in further detail below, the Mobile Router and the Home Agent may update a table with link characteristics upon successfull registration of the Mobile Router with the Home Agent at 602. Specifically, the link characteristics indicate whether the link is a "fat" or a "thin" pipe. For instance the link characteristics may indicate the MTU of the link, as well as type of link, latency, delay characteristics, error rates, etc. Exemplary tables will be described in further detail below with reference to FIGS. 7E-F. From such tables, it is possible for the Mobile Router and Home Agent to determine whether the Mobile Router has roamed from a low bandwidth link to a high bandwidth link.

As set forth above with reference to FIG. 5, the mobile network node sends a TCP SYN at 604 to a Correspondent Node. In response, the Correspondent Node sends a TCP SYN ACK at 606 addressed to the mobile network node at the Mobile Router. When the Mobile Router receives the TCP SYN ACK at 608, the Mobile Router forwards the TCP SYN ACK to the mobile network node at 610.

Upon receiving a TCP SYN ACK, the mobile network node sends a TCP ACK addressed to the Correspondent Node at 614. The Home Agent receives the TCP ACK at 616. The Home Agent may then generate one or more TCP ACKs or modify the TCP ACK that it has received.

In accordance with one embodiment, the Home Agent determines that the mobile network device (e.g., Mobile Router) has moved from a low to a high bandwidth link or has added a high bandwidth link via registration at 618. The Home Agent may make this determination by comparing the link characteristics of a current session with those of a previous session. This may be accomplished by looking up the link characteristics of the previous session in a table such as that described in further detail below with reference to FIG. 7F.

Once the Home Agent has determined that the Mobile Router has moved from a low to a high bandwidth link, it generates and sends one or more TCP ACK packets to the Correspondent Node at 620. More specifically, the Home Agent obtains the sequence number from the TCP ACK packet it has previously received. For instance, the sequence number may be obtained from a table such as that described in further detail below with reference to FIG. 7F. The new TCP ACK packet(s) it has generated each includes a different sequence number. More specifically, the first TCP ACK packet includes the sequence number, while each subsequent TCP ACK packet includes a sequence number within a range of sequence numbers indicated by the sequence number provided in the TCP ACK received by the Home Agent. For instance, the sequence number provided by the Home Agent in the TCP ACK packet may be one or more less than the sequence number obtained from the TCP ACK received by the Home Agent. The Home Agent then sends these new TCP ACK packets to the Correspondent Node. In this manner, the Home Agent "resends" the TCP ACK packet multiple times with different sequence numbers.

When the Mobile Router receives a TCP ACK from the Correspondent Node (e.g., in response to data transmitted by the Mobile Router to the Correspondent Node), the Mobile Router may generate one or more new TCP ACK packets or modify the TCP ACK it has received In accordance with one embodiment, the Mobile Router determines that it has moved from a low to a high bandwidth link or has added a high bandwidth link via registration with its Home Agent at 622. The Mobile Router may make this determination by comparing the link characteristics of a current session with those of a previous session. This may be accomplished by looking up the link characteristics of the previous session in a table such as that described in further detail below with reference to FIG. 7E.

Once the Mobile Router has determined that it has moved from a low to a high bandwidth link, it generates and sends one or more TCP ACK packets to the mobile network node at 624. More specifically, the Mobile Router obtains the sequence number from the TCP ACK packet it has previously received. For instance, the sequence number may be obtained from a table such as that described in further detail below with reference to FIG. 7E. The new TCP ACK packet(s) it has generated each includes a different sequence number. More specifically, the first TCP ACK packet includes the sequence number, while each subsequent TCP ACK packet includes a sequence number within a range of sequence numbers indicated by the sequence number provided in the TCP ACK received by the Mobile Router. For instance, the sequence number provided by the Mobile Router in the TCP ACK packet may be one or more less than the sequence number obtained from the TCP ACK received by the Mobile Router. The Mobile Router then sends these new TCP ACK packets to the mobile network node. In this manner, the Mobile Router "resends" the TCP ACK packet multiple times with different sequence numbers.

It is important to note that the sequence number in each of the TCP ACK packets sent by the Mobile Router is different. Moreover, the source IP address of each of these TCP ACK packets includes an IP address of the Correspondent Node. In this manner, the Mobile Router spoofs the mobile network node into thinking that the correspondent node ready to receive more packets.

It is important to note that the sequence number in each of the TCP ACK packets sent by the Home Agent is different. Moreover, the source IP address of each of these TCP ACK packets includes an IP address of the mobile network node. In this manner, the Home Agent spoofs the Correspondent Node into thinking that the mobile network node is ready to receive more packets (e.g., TCP segments).

While the example described with reference to FIG. 6 relates to a Mobile Router, such a method may also be performed with a Mobile Node. More particularly, the steps performed by a Mobile Router or Mobile Network Node in steps 602-620 may be performed by the Mobile Node. Moreover, packets sent to/from the Mobile Router or mobile network node in steps 602-620 may be sent to/from the Mobile Node.

FIGS. 7A-D illustrate various methods of performing optimizations in a system in which the mobile network device roams from a high bandwidth link to a low bandwidth link.

Figure 7A:
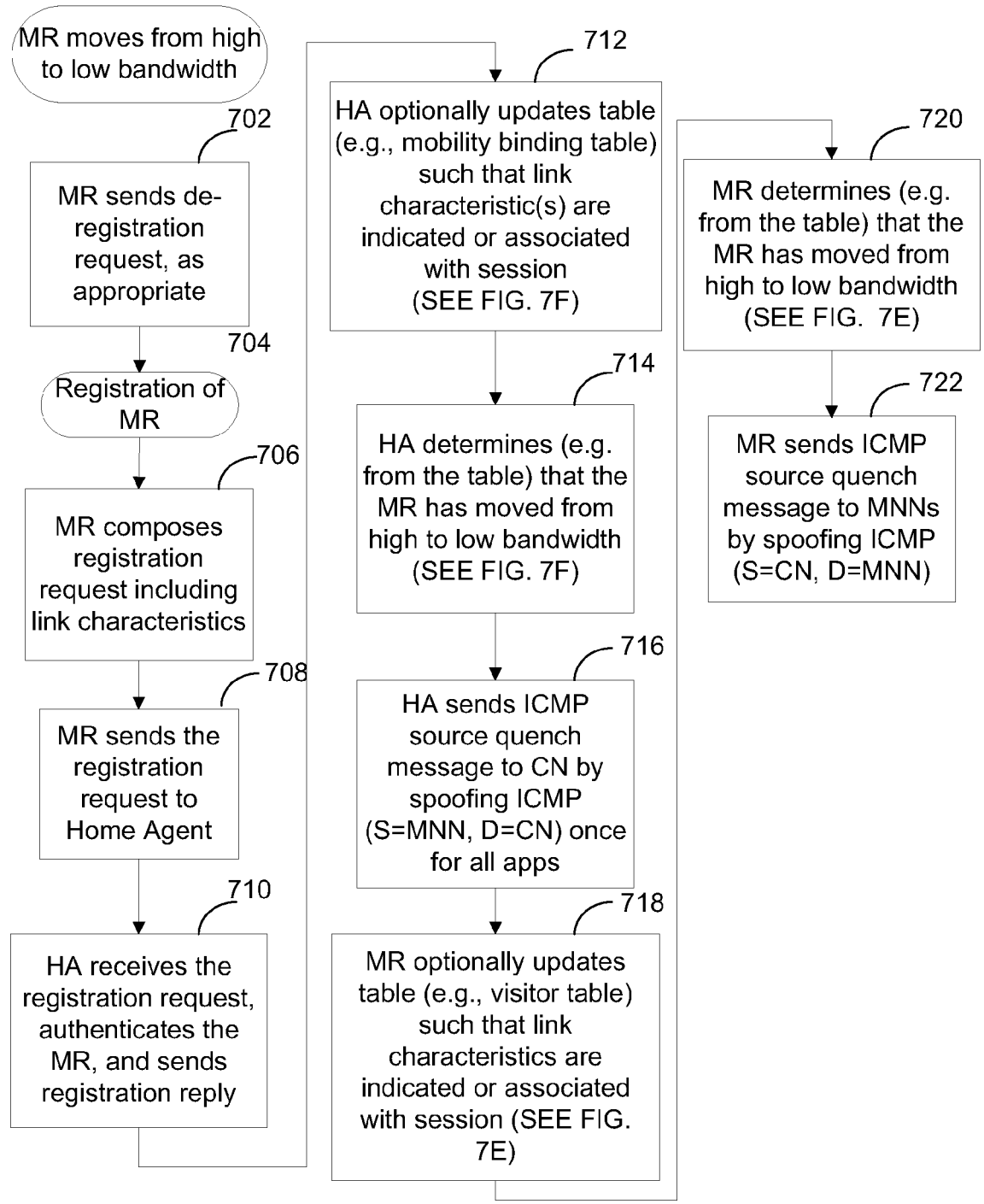
FIG. 7A is a process flow diagram illustrating a method of optimizing communications when a mobile network device moves from a high to a low bandwidth link by sending an ICMP source quench message during or upon completion of Mobile IP registration in accordance with a third embodiment of the invention.

FIG. 7A is a process flow diagram illustrating a method of optimizing communications when a mobile network device moves from a high to a low bandwidth link by sending an ICMP source quench message during or upon completion of Mobile IP registration in accordance with a third embodiment of the invention. As a mobile network device such as a Mobile Router roams, it may send a de-registration request at 702 to notify its Home Agent that it has roamed from its prior location. In order to register with the Home Agent at 704, the Mobile Router composes a registration request including link characteristics of the link via which the registration request is sent at 706. The Mobile Router then sends the registration request to the Home Agent at 708.

When the Home Agent receives the registration request, the Home Agent authenticates the Mobile Router, and composes and sends a registration reply indicating success or failure of the registration with the Home Agent at 710. In addition, the Home Agent may obtain the link characteristics from the registration request and update a table such as a mobility binding table with the link characteristics such that the link characteristics are associated with the session at 712. An exemplary table that may be maintained by the Home Agent will be described in further detail below with reference to FIG. 7F.

In addition, the Home Agent determines that the Mobile Router has moved from a high to a low bandwidth link at 714. This may be accomplished by comparing the link characteristics of the current session with the link characteristics associated with a prior session of the Mobile Router. The link characteristics associated with the prior session (and optionally the current session) may be obtained from a table such as that described below with reference to FIG. 7F.

Upon determining that the Mobile Router has moved from a high to low bandwidth link, the Home Agent sends an Internet Control Message Protocol (ICMP) source quench message as set forth in RFC 792, entitled "Internet Control Message Protocol," by J. Postel, published September 1981, which is incorporated herein by reference for all purposes, to the Correspondent Node for that session at 716. More particularly, the ICMP source quench message includes a source IP address equal to the mobile network node's IP address and a destination IP address equal to the Correspondent Node's IP address. In accordance with one embodiment, a single ICMP source quench message is sent for each mobile network node, regardless of the number of sessions associated with each mobile network node. Thus, a single ICMP source quench message is sent to each endpoint.

The Mobile Router may also update a table such as a visitor table with the link characteristics at 718 such that the link characteristics are associated with the session. An exemplary table that may be maintained by the Mobile Router will be described in further detail below with reference to FIG. 7E. In addition, the Mobile Router may determine (e.g., from a table such as that described below with reference to FIG. 7E) that the Mobile Router has moved from a high to a low bandwidth link at 720. As set forth above, this may be accomplished by comparing the link characteristics of the current session with the link characteristics associated with a prior session of the Mobile Router. The link characteristics associated with the prior session (and optionally the current session) may be obtained from a table such as that described below with reference to FIG. 7E.

Upon determining that the Mobile Router has moved from a high to a low bandwidth link, the Mobile Router sends an ICMP source quench message to each mobile network node coupled to the Mobile Router at 722. More particularly, each ICMP source quench message includes a source IP address equal to the Correspondent Node's IP address and a destination IP address equal to the corresponding mobile network node's IP address. In accordance with one embodiment, a single ICMP source quench message is sent to each mobile network node, regardless of the number of sessions associated with each mobile network node.

While the example described with reference to FIG. 7A relates to a Mobile Router, such a method may also be implemented with a Mobile Node. Specifically, steps 702-718 may be performed.

Figure 7B:
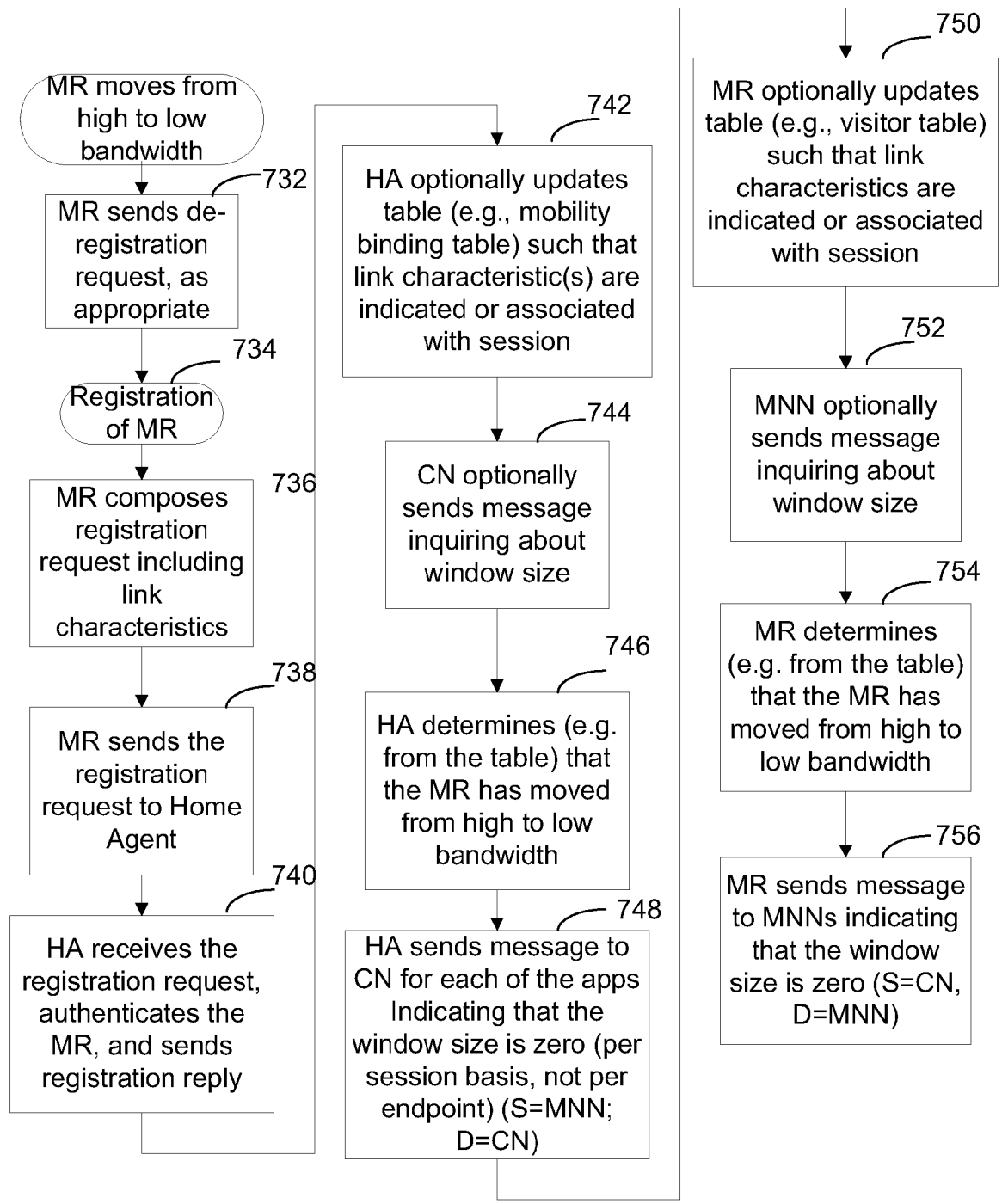
FIG. 7B is a process flow diagram illustrating a method of optimizing communications when a mobile network device moves from a high to a low bandwidth link by sending a message indicating that the window size is zero during or upon completion of Mobile EP registration in accordance with a fourth embodiment of the invention.

FIG. 7B is a process flow diagram illustrating a method of optimizing communications when a mobile network device moves from a high to a low bandwidth link by sending a message indicating that the window size is zero during or upon completion of Mobile IP registration in accordance with a fourth embodiment of the invention. As a mobile network device such as a Mobile Router roams, it may send a de-registration request at 732 to notify its Home Agent that it has roamed from its prior location. In order to register with the Home Agent at 734, the Mobile Router composes a registration request including link characteristics of the link via which the registration request is sent at 736. The Mobile Router then sends the registration request to the Home Agent at 738.

When the Home Agent receives the registration request, the Home Agent authenticates the Mobile Router, and composes and sends a registration reply indicating success or failure of the registration with the Home Agent at 740. In addition, the Home Agent may obtain the link characteristics from the registration request and update a table such as a mobility binding table with the link characteristics such that the link characteristics are associated with the session at 742. An exemplary table that may be maintained by the Home Agent will be described in further detail below with reference to FIG. 7F.

A Correspondent Node may optionally send a message to the node it is communicating with (e.g., mobile network node) inquiring about the window size (e.g., TCP window size) at 744. The Home Agent determines that the Mobile Router has moved from a high to a low bandwidth link at 746. This may be accomplished by comparing the link characteristics of the current session with the link characteristics associated with a prior session of the Mobile Router. The link characteristics associated with the prior session (and optionally the current session) may be obtained from a table such as that described below with reference to FIG. 7F.

Upon determining that the Mobile Router has moved from a high to low bandwidth link, the Home Agent sends a message (e.g., TCP message) indicating a window size equal to zero as set forth in RFC 793, entitled, Transmission Control Protocol, published September 1981, which is incorporated herein by reference for all purposes, to the Correspondent Node for each session of the Correspondent Node at 748. Therefore, the message is sent "on behalf of" one or more nodes (e.g., mobile network nodes). More particularly, the TCP message includes a source IP address equal to the IP address of the node communicating with the Correspondent Node (e.g., a mobile network node's IP address) and a destination IP address equal to the Correspondent Node's IP address. In accordance with one embodiment, a single TCP message is sent for each session, regardless of the number of mobile network nodes. Thus, one or more messages may be sent to a Correspondent Node "on behalf of" a node.

The Mobile Router may also update a table such as a visitor table with the link characteristics at 750 such that the link characteristics are associated with the session. An exemplary table that may be maintained by the Mobile Router will be described in further detail below with reference to FIG. 7E. The mobile network node may optionally send a message to the Correspondent Node inquiring about the window size at 752. In addition, the Mobile Router may determine (e.g., from a table such as that described below with reference to FIG. 7E) that the Mobile Router has moved from a high to a low bandwidth link at 754. As set forth above, this may be accomplished by comparing the link characteristics of the current session with the link characteristics associated with a prior session of the Mobile Router. The link characteristics associated with the prior session (and optionally the current session) may be obtained from a table such as that described below with reference to FIG. 7E.

Upon determining that the Mobile Router has moved from a high to a low bandwidth link, the Mobile Router sends a TCP message for each session to each mobile network node coupled to the Mobile Router at 756. More particularly, each TCP message includes a source IP address equal to the Correspondent Node's IP address and a destination IP address equal to the corresponding mobile network node's IP address. In accordance with one embodiment, a TCP message is sent to each mobile network node for each session associated with each mobile network node. Thus, multiple TCP messages may be sent to a single mobile network node.

While the example described with reference to FIG. 7B relates to a Mobile Router, such a method may also be implemented with a Mobile Node. Specifically, steps 732-750 may be performed. However, it is important to note that at 748, each message sent by the Home Agent to the Correspondent Node includes a source IP address equal to the IP address of the Mobile Node, which is the node communicating with the Correspondent Node.

Figure 7C:
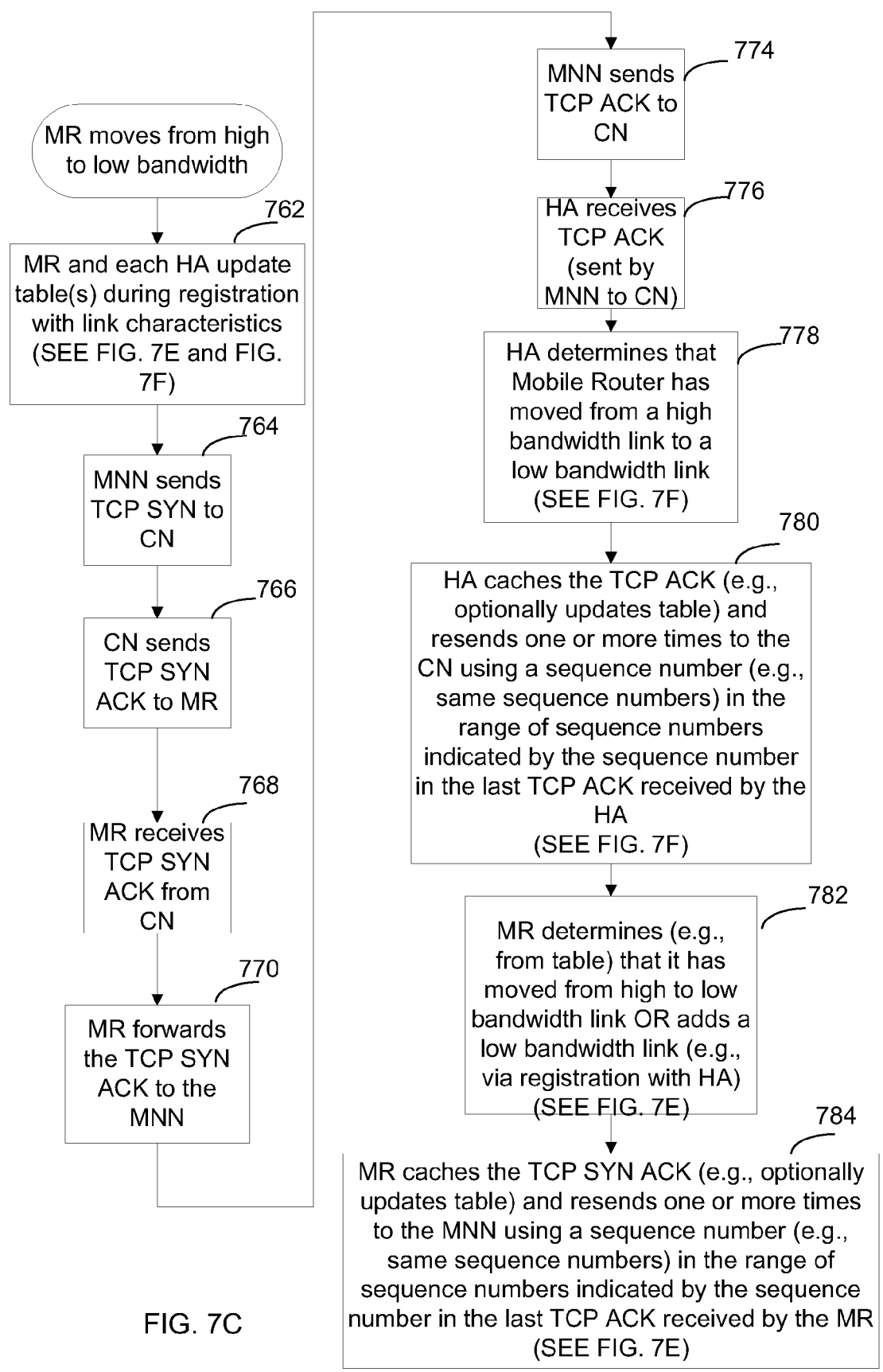
FIG. 7C is a process flow diagram illustrating a method of establishing a TCP session when a Mobile Router moves from a high bandwidth link to a low bandwidth link in accordance with a fifth embodiment of the invention.

FIG. 7C is a process flow diagram illustrating a method of establishing a TCP session when a Mobile Router moves from a high bandwidth link to a low bandwidth link in accordance with a fifth embodiment of the invention. As will be described in further detail below, the Mobile Router and the Home Agent may update a table with link characteristics upon successful registration of the Mobile Router with the Home Agent at 762. Exemplary tables will be described in further detail below with reference to FIGS. 7E-F. From such tables, it is possible for the Mobile Router and Home Agent to determine whether the Mobile Router has roamed from a high bandwidth link to a low bandwidth link.

As set forth above with reference to FIG. 5, the mobile network node sends a TCP SYN at 764 to a Correspondent Node. In response, the Correspondent Node sends a TCP SYN ACK at 766 addressed to the mobile network node at the Mobile Router. When the Mobile Router receives the TCP SYN ACK at 768, the Mobile Router forwards the TCP SYN ACK to the mobile network node at 770.

Upon receiving a TCP ACK, the mobile network node sends a TCP ACK addressed to the Correspondent Node at 774. The Home Agent receives the TCP ACK at 776. The Home Agent may then generate one or more TCP ACKs or modify the TCP ACK that it has received.

In accordance with one embodiment, the Home Agent determines that the mobile network device (e.g., Mobile Router) has moved from a high to a low bandwidth link or has added a low bandwidth link via registration at 778. The Home Agent may make this determination by comparing the link characteristics of a current session with those of a previous session. This may be accomplished by looking up the link characteristics of the previous session in a table such as that described in further detail below with reference to FIG. 7F.

Once the Home Agent has determined that the Mobile Router has moved from a high to a low bandwidth link, it generates and sends one or more TCP ACK packets to the Correspondent Node at 780. More specifically, the Home Agent obtains the sequence number from the TCP ACK packet it has previously received. For instance, the sequence number may be obtained from a table such as that described in further detail below with reference to FIG. 7F. The new TCP ACK packet(s) it has generated each includes the same sequence number. More specifically, each TCP ACK packet may include the sequence number of the TCP packet received by the Home Agent or a sequence number within a range of sequence numbers indicated by the sequence number of the TCP packet received by the Home Agent. The Home Agent then sends these new TCP ACK packets to the Correspondent Node. In this manner, the Home Agent "resends" the TCP ACK packet multiple times with the same sequence number.

It is important to note that the sequence number in each of the TCP ACK packets sent by the Home Agent is the same. Moreover, the source IP address of each of these TCP ACK packets includes an IP address of the mobile network node. In this manner, the Home Agent spoofs the Correspondent Node into thinking that it can send more packets quickly.

When the Mobile Router receives a TCP ACK from the Correspondent Node (e.g., in response to data transmitted by the Mobile Router to the Correspondent Node), the Mobile Router may generate one or more new TCP ACK packets or modify the TCP ACK it has received.

In accordance with one embodiment, the Mobile Router determines that it has moved from a high to a low bandwidth link or has added a low bandwidth link via registration with its Home Agent at 782. The Mobile Router may make this determination by comparing the link characteristics of a current session with those of a previous session. This may be accomplished by looking up the link characteristics of the previous session in a table such as that described in further detail below with reference to FIG. 7E.

Once the Mobile Router has determined that it has moved from a high to a low bandwidth link, it generates and sends one or more TCP ACK packets to the mobile network node at 784. More specifically, the Mobile Router obtains the sequence number from the TCP ACK packet it has previously received. For instance, the sequence number may be obtained from a table such as that described in further detail below with reference to FIG. 7E. The new TCP ACK packet(s) it has generated each includes the same sequence number. More specifically, each TCP ACK packet may include the sequence number of the TCP packet received by the Mobile Router or a sequence number within a range of sequence numbers indicated by (e.g., one or more less than) the sequence number of the TCP packet received by the Mobile Router. The Mobile Router then sends these new TCP ACK packets to the mobile network node. In this manner, the Mobile Router "resends" the TCP ACK packet multiple times with the same sequence number.

It is important to note that the sequence number in each of the TCP ACK packets sent by the Mobile Router is the same. Moreover, the source IP address of each of these TCP ACK packets includes an IP address of the Correspondent Node. In this manner, the Mobile Router spoofs the mobile network node into thinking that it can send more packets quickly.

While the example described with reference to FIG. 7C relates to a Mobile Router, such a method may also be performed with a Mobile Node. More particularly, the steps performed by a Mobile Router or Mobile Network Node in steps 762-780 may be performed by the Mobile Node. Moreover, packets sent to/from the Mobile Router or mobile network node in steps 762-780 may be sent to/from the Mobile Node.

Figure 7D:
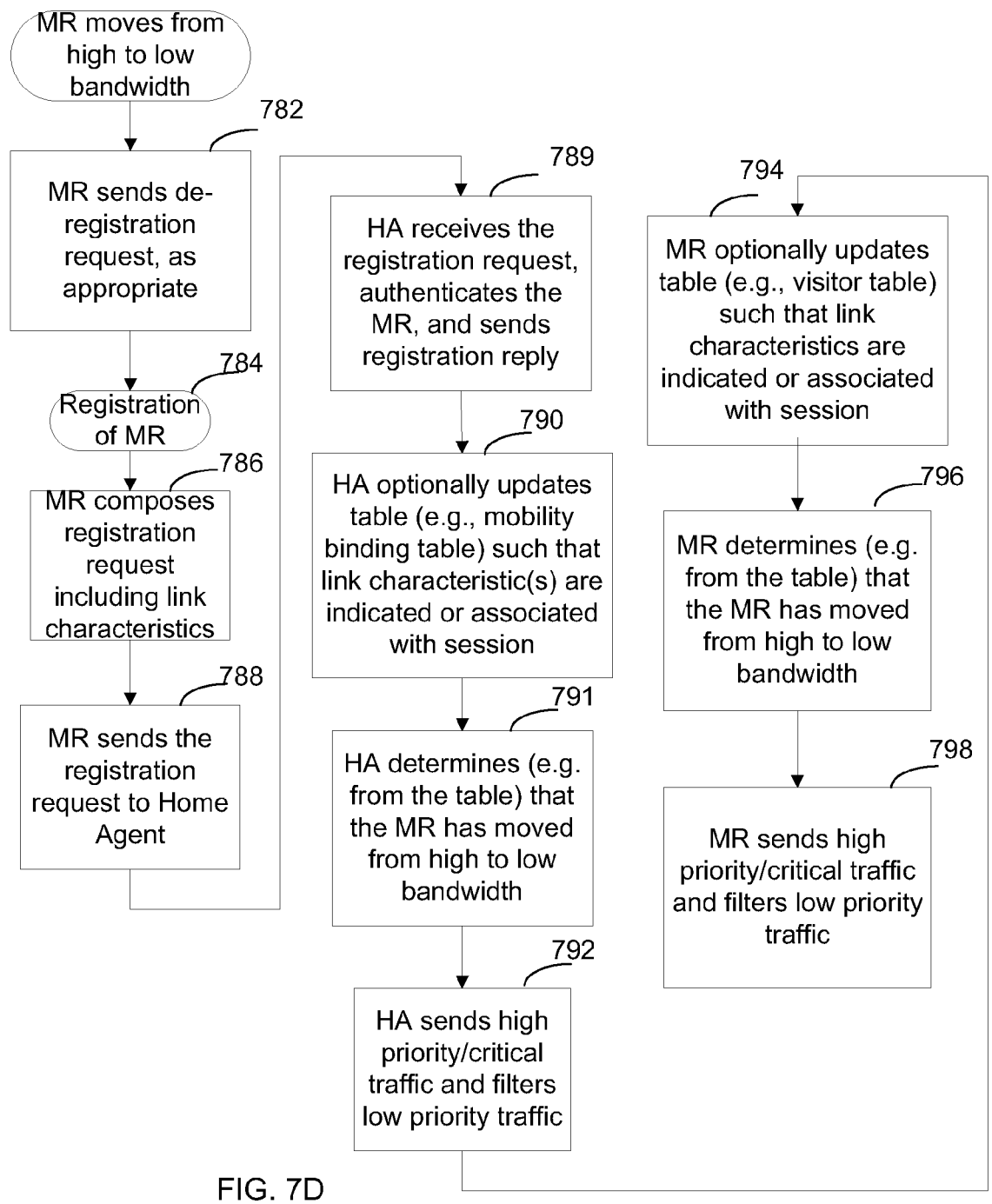
FIG. 7D is a process flow diagram illustrating a method of optimizing communications when a mobile network device moves from a high to a low bandwidth link by filtering traffic during or upon completion of Mobile IP registration in accordance with a sixth embodiment of the invention.

FIG. 7D is a process flow diagram illustrating a method of optimizing communications when a mobile network device moves from a high to a low bandwidth link by filtering traffic during or upon completion of Mobile IP registration in accordance with a sixth embodiment of the invention. As a mobile network device such as a Mobile Router roams, it may send a de-registration request at 782 to notify its Home Agent that it has roamed from its prior location. In order to register with the Home Agent at 784, the Mobile Router composes a registration request including link characteristics of the link via which the registration request is sent at 786. The Mobile Router then sends the registration request to the Home Agent at 788.

When the Home Agent receives the registration request, the Home Agent authenticates the Mobile Router, and composes and sends a registration reply indicating success or failure of the registration with the Home Agent at 789. In addition, the Home Agent may obtain the link characteristics from the registration request and update a table such as a mobility binding table with the link characteristics such that the link characteristics are associated with the session at 790. An exemplary table that may be maintained by the Home Agent will be described in further detail below with reference to FIG. 7F.

In addition, the Home Agent determines that the Mobile Router has moved from a high to a low bandwidth link at 791. This may be accomplished by comparing the link characteristics of the current session with the link characteristics associated with a prior session of the Mobile Router. The link characteristics associated with the prior session (and optionally the current session) may be obtained from a table such as that described below with reference to FIG. 7F. Upon determining that the Mobile Router has moved from a high to low bandwidth link, the Home Agent sends high priority traffic to the Correspondent Node for that session at 792, while filtering low priority traffic directed to the Correspondent Node. Specifically, filtering may be performed according to the Quality of Service (QoS) or other criteria indicating priority of traffic.

The Mobile Router may also update a table such as a visitor table with the link characteristics at 794 such that the link characteristics are associated with the session. An exemplary table that may be maintained by the Mobile Router will be described in further detail below with reference to FIG. 7E. In addition, the Mobile Router may determine (e.g., from a table such as that described below with reference to FIG. 7E) that the Mobile Router has moved from a high to a low bandwidth link at 796. As set forth above, this may be accomplished by comparing the link characteristics of the current session with the link characteristics associated with a prior session of the Mobile Router. The link characteristics associated with the prior session (and optionally the current session) may be obtained from a table such as that described below with reference to FIG. 7E.

Upon determining that the Mobile Router has moved from a high to a low bandwidth link, the Mobile Router sends high priority traffic to each mobile network node coupled to the Mobile Router at 798, while filtering low priority traffic directed to each mobile network node coupled to the Mobile Router.

When traffic is filtered by the Mobile Router or the Home Agent, the traffic is filtered according to priority of the traffic. The priority may be indicated by a QOS field, or another field.

While the example described with reference to FIG. 7D relates to a Mobile Router, such a method may also be implemented with a Mobile Node. Specifically, steps 782-792 may be performed such that the Home Agent filters traffic. Steps 794-798 are not performed by the Mobile Node.

FIG. 7E is an exemplary table that may be maintained by a mobile network device such as a Mobile Router in accordance with various embodiments of the invention. Table 1702 may be a visitor table, for example. The table 1702 may include a session field 1704 identifying a session between a mobile network node and a Correspondent Node, for example. For instance, the session field 1704 may identify the mobile network node and the Correspondent Node. A link characteristics field 1706 may indicate whether the link is a high or a low bandwidth link. More particularly, the link characteristics field 1706 may identify the link characteristics of the link. Such link characteristics may be, for example, the MTU and/or type of link, bandwidth of link, latency, delay characteristics etc. The table 1702 may also include a sequence number field 1708 for identifying a sequence number obtained from or provided in a TCP SYN ACK or TCP ACK message.

FIG. 7F is an exemplary table that may be maintained by a Home Agent in accordance with various embodiments of the invention. Table 1710 may be a mobility binding table, for example. The table 1710 may include a session field 1712 identifying a session between a mobile network node and a Correspondent Node, for example. For instance, the session field 1712 may identify the mobile network node and the Correspondent Node. The table 1710 may also identify a Mobile Router 1714 associated with the session. A link characteristics field 1716 may indicate whether the link is a high or a low bandwidth link. More particularly, the link characteristics field 1716 may identify the link characteristics of the link, as set forth above. The table 1702 may also include a sequence number field 1718 for identifying a sequence number obtained from or provided in a TCP SYN ACK or TCP ACK message.

The examples set forth above are illustrated with respect to a Mobile IPv4 environment. The disclosed embodiments may also be performed in other versions of Mobile IP. For instance, the disclosed embodiments may be performed in a Mobile IPv6 environment. As described above, a registration request in a Mobile IPv6 environment is referred to as a Binding Update and a registration reply in a Mobile IPv6 environment is referred to as a Binding Acknowledgement. Optimizations in a Mobile IPv6 environment may be accomplished via registration with a Correspondent Node directly, enabling a mobile network device such as a Mobile Router or Mobile Node to communicate directly with the Correspondent Node without interception by a Home Agent. Systems and methods supporting optimizations in a Mobile IPv6 environment are disclosed in patent application Ser. No. 11/129,265, entitled "Methods and Apparatus for Implementing Mobile IPv6 Route Optimization Enhancements," by Patel et al, filed on May 12, 2005, which is incorporated herein by reference for all purposes.

Figure 8:
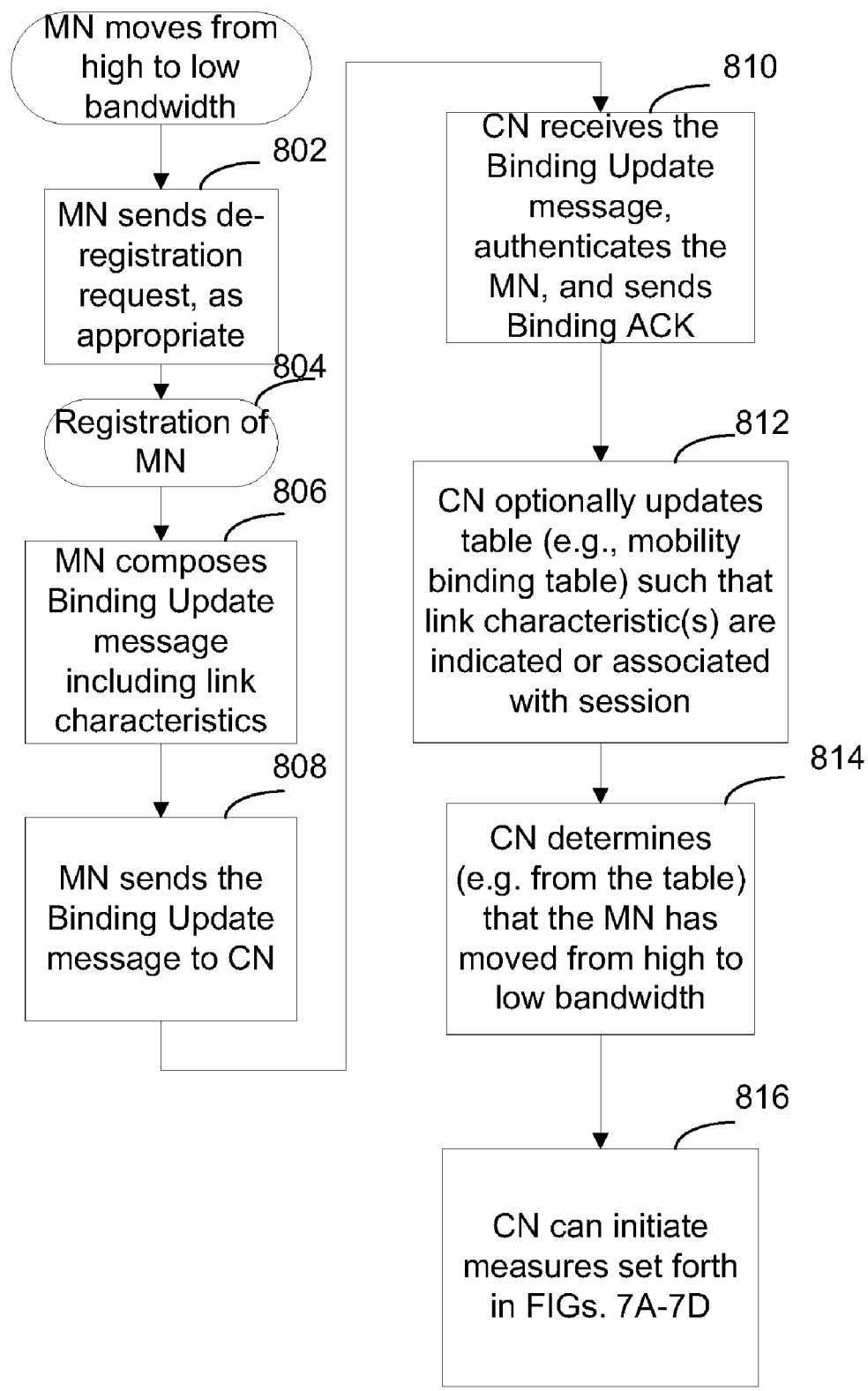
FIG. 8 is a process flow diagram illustrating a method of optimizing communications when a Mobile Node moves from a high bandwidth link to a low bandwidth link in a Mobile IPv6 environment implementing route optimization in accordance with a seventh embodiment of the invention.

FIG. 8 is a process flow diagram illustrating a method of optimizing communications when a Mobile Node moves from a high bandwidth link to a low bandwidth link in a Mobile IPv6 environment implementing route optimization in accordance with a seventh embodiment of the invention. When a Mobile Node roams, it may send a de-registration request, as appropriate, at 802. In order to establish route optimization, the Mobile Node registers directly with the Correspondent Node at 804. More particularly, the Mobile Node composes a Binding Update message including link characteristics of a link via which the Binding Update message is to be sent at 806. The Mobile Node then sends the Binding Update message to the Correspondent Node at 808.

When the Correspondent Node receives the Binding Update message, it authenticates the Mobile Node and sends a Binding Acknowledgement message to the Mobile Node at 810. The Correspondent Node optionally updates a table such as a mobility binding table maintained by a Home Agent, as set forth above with reference to FIG. 7F, such that the link characteristics are associated with the session at 812. The Correspondent Node then determines (e.g., via the table) whether the Mobile Node has moved from a high to a low bandwidth link, as set forth above.

Upon determining that the Mobile Node has moved from a high to a low bandwidth link at 814, the Correspondent Node can then initiate measures initiated by the Home Agent as set forth above with reference to FIGS. 7A-7D. For instance, as set forth with reference to 716 of FIG. 7A, the Correspondent Node may send an ICMP source quench message to the Mobile Node. Similarly, with reference to 748 of FIG. 7B, the Correspondent Node may send a message to the Mobile Node indicating that the window size is zero. With respect to 780 of FIG. 7C, upon receiving a TCP ACK message, the Correspondent Node may resend the TCP ACK to the Mobile Node multiple times with the same sequence number. Moreover, with respect to 792 of FIG. 7D, the Correspondent Node may filter low priority traffic in favor of high priority traffic that is sent to the Mobile Node.

The apparatus (e.g. Mobile Node, Mobile Router, Home Agent, or Correspondent Node) of this invention may be specially constructed for the required purposes, or may be a general-purpose programmable machine selectively activated or reconfigured by a computer program stored in memory. The processes presented herein are not inherently related to any particular router or other apparatus. In a preferred embodiment, any of the Home Agents of this invention may be specially configured routers such as specially configured router models 1700, 1800, 2500, 2600, 3200, 3600, 4000, 4500, 4700, 7200, and 7500 available from Cisco Systems, Inc. of San Jose, Calif. A general structure for some of these machines will appear from the description given below.

Generally, the techniques of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid system of this invention is preferably implemented on a general-purpose programmable machine selectively activated or reconfigured by a computer program stored in memory. Such programmable machine may be a network device designed to handle network traffic. Such network devices typically have multiple network interfaces including frame relay, ISDN, and wireless interfaces, for example. Specific examples of such network devices include routers and switches. For example, the roaming systems of this invention may be specially configured routers such as specially configured router models 350, 1100, 1200, 1400, 1600, 2500, 2600, 3200, 3600, 4500, 4700, 7200, 7500, and 12000 available from Cisco Systems, Inc. of San Jose, Calif. A general architecture for some of these machines will appear from the description given below. In an alternative embodiment, the registration system may be implemented on a general-purpose network host machine such as a personal computer or workstation. Further, the invention may be at least partially implemented on a card (e.g., an interface card) for a network device or a general-purpose computing device.

Referring now to FIG. 9, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, etc. It preferably accomplishes all these functions under the control of software including an operating system (e.g., the Internetwork Operating System (IOS®) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 9 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 1161) configured to store program instructions for the general-purpose network operations and mechanisms for authentication and registration functions described herein. The program instructions may control the operation of an operating system and/or one or more applications, for example. The memory or memories may also be configured to store tables such as mobility binding, registration, and association tables, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a computer-readable medium in which a carrier wave travels over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Moreover, although the example described refers primarily to IPv4 and IPv6, the present invention may be used with other versions of IP. Therefore, the described embodiments should be taken as illustrative and not restrictive, and the invention should not be limited to the details given herein but should be defined by the following claims and their full scope of equivalents.

What is claimed is:

1. In a mobile network device, a method of registering with a Home Agent, comprising:
   composing a registration request message including link characteristics;
   sending the registration request to the Home Agent, the link characteristics being associated with a link via which the registration request message is sent to the Home Agent;
   receiving a registration reply from the Home Agent indicating success or failure of the registration with the Home Agent, wherein the mobile network device is a Mobile Router; and
   sending an ICMP source quench message to each node coupled to the Mobile Router, wherein a source IP address of the ICMP source quench message is an IP address of a Correspondent Node.

2. The method 1, further comprising:
   updating a table associating the link characteristics with a session.

3. The method as recited in claim 1, wherein sending the ICMP source quench message is performed when it is determined that the Mobile Router has moved from a high bandwidth link to a low bandwidth link.

4. In a mobile network device, a method of registering with a Home Agent, comprising:
   composing a registration request message including link characteristics;
   sending the registration request to the Home Agent, the link characteristics being associated with a link via which the registration request message is sent to the Home Agent;
   receiving a registration reply from the Home Agent indicating success or failure of the registration with the Home Agent, wherein the mobile network device is a Mobile Router; and
   determining whether the Mobile Router has moved from a high bandwidth link to a low bandwidth link.

5. The method as recited in claim 4, wherein the Mobile Router has moved from a high bandwidth link to a low bandwidth link when the link has a lower bandwidth than a link via which the Mobile Router has previously registered with the Home Agent.

6. The method as recited in claim 4, wherein determining whether the Mobile Router has moved from a high bandwidth link to a low bandwidth link comprises:
   obtaining link characteristics associated with a previous session from a table; and
   comparing the link characteristics associated with the previous session with link characteristics associated with a current session.

7. The method as recited in claim 4, further comprising:
   sending an ICMP source quench message to each node coupled to the Mobile Router, wherein a source IP address of the ICMP source quench message is an IP address of a Correspondent Node;
   wherein sending the ICMP source quench message is performed when the Mobile Router has determined that it has moved from a high bandwidth link to a low bandwidth link.

8. The method as recited in claim 4, further comprising:
   sending a message to one or more nodes coupled to the Mobile Router indicating that a window size is zero;
   wherein sending the message is performed when the Mobile Router has determined that it has moved from a high bandwidth link to a low bandwidth link.

9. The method as recited in claim 4, further comprising:
filtering traffic according to priority when the Mobile Router has determined that it has moved from a high bandwidth link to a low bandwidth link.

10. In a mobile network node, a method of registering with a Correspondent Node, comprising:
composing a registration request message including link characteristics;
sending the registration request to the Correspondent Node, the link characteristics being associated with a link via which the registration request message is sent to the Correspondent Node; and
receiving a registration reply message from the Correspondent Node indicating success or failure of the registration with the Correspondent Node, wherein the Correspondent Node is not a Home Agent.

11. The method as recited in claim 10, wherein the registration request message is a Binding Update and the registration reply message is a Binding Acknowledgement.

12. The method as recited in claim 10, wherein the mobile network node is a Mobile Node supporting Mobile JPv6.

13. The method 10, further comprising:
updating a table associating the link characteristics with the session generated upon successful registration with the Correspondent Node.

14. In a Correspondent Node, a method of registering a mobile network device, comprising:
receiving a registration request message including link characteristics from the mobile network device, the link characteristics being associated with a link via which the registration request message is sent to the Correspondent Node; and
composing a registration reply message indicating success or failure of the registration with the Correspondent Node; and
sending the registration reply message to the mobile network device, wherein the Correspondent Node is not a Home Agent.

15. The method as recited in claim 14, wherein the registration request message is a Binding Update and the registration reply message is a Binding Acknowledgement.

16. The method as recited in claim 14, wherein the mobile network device is a Mobile Node supporting Mobile JPv6.

17. The method 14, further comprising:
updating a table associating the link characteristics with the session.

18. In a Correspondent Node, a method of registering a mobile network device, comprising:
receiving a registration request message including link characteristics from the mobile network device, the link characteristics being associated with a link via which the registration request message is sent to the Correspondent Node; and
composing a registration reply message indicating success or failure of the registration with the Correspondent Node;
sending the registration reply message to the mobile network device; and
sending an ICMP source quench message to the mobile network device, wherein a source IP address of the ICMP source quench message is an IP address of the Correspondent Node.

19. The method as recited in claim 18, wherein sending the ICMP source quench message is performed when the mobile network device has moved from a high bandwidth link to a low bandwidth link.

20. In a Correspondent Node, a method of registering a mobile network device, comprising:
receiving a registration request message including link characteristics from the mobile network device, the link characteristics being associated with a link via which the registration request message is sent to the Correspondent Node; and
composing a registration reply message indicating success or failure of the registration with the Correspondent Node;
sending the registration reply message to the mobile network device; and
determining whether the mobile network device has moved from a high bandwidth link to a low bandwidth link.

21. The method as recited in claim 20, wherein the mobile network device has moved from a high bandwidth link to a low bandwidth link when the link has a lower bandwidth than a link via which the mobile network device has previously registered with the Correspondent Node.

22. The method as recited in claim 20, wherein determining whether the mobile network device has moved from a high bandwidth link to a low bandwidth link comprises:
obtaining link characteristics associated with a previous session from a table; and
comparing the link characteristics associated with the previous session with link characteristics associated with a current session.

23. The method as recited in claim 20, further comprising:
sending an ICMP source quench message to the mobile network node, wherein a source IP address of the ICMP source quench message is an IP address of the Correspondent Node;
wherein sending the ICMP source quench message is performed when the Correspondent Node has determined that the mobile network device has moved from a high bandwidth link to a low bandwidth link.

24. The method as recited in claim 20, further comprising:
sending a message to the mobile network device indicating that a window size is zero;
wherein sending the message is performed when the Correspondent Node has determined that the mobile network device has moved from a high bandwidth link to a low bandwidth link.

25. The method as recited in claim 20, further comprising:
filtering traffic according to priority when the mobile network device has moved from a high bandwidth link to a low bandwidth link.

26. In a network device, a method of registering a mobile network device with the network device, comprising:
receiving a registration request from the mobile network device, the registration request including link characteristics, the link characteristics being associated with a link via which the registration request message has been sent to the network device;
authenticating the mobile network device;
composing a registration reply indicating success or failure of the registration of the mobile network device with the network device, wherein a session is created when registration is successful;
sending the registration reply to the mobile network device;
sending an ICMP source quench message to a Correspondent Node, wherein a source IP address of the ICMP source quench message is an IP address of the mobile network device; and when registration is successful, updating a table associating the link characteristics with the session, wherein the network device is a Home Agent.

27. The method as recited in claim 26, wherein sending the ICMP source quench message is performed when it is determined that the mobile network device has moved from a high bandwidth link to a low bandwidth link.

28. The method as recited in claim 26, wherein the table is a mobility binding table.

29. In a network device, a method of registering a mobile network device with the network device, comprising:
   receiving a registration request from the mobile network device, the registration request including link characteristics, the link characteristics being associated with a link via which the registration request message has been sent to the network device;
   authenticating the mobile network device;
   composing a registration reply indicating success or failure of the registration of the mobile network device with the network device, wherein a session is created when registration is successful;
   sending the registration reply to the mobile network device;
   when registration is successful, updating a table associating the link characteristics with the session; and
   determining whether the mobile network device has moved from a high bandwidth link to a low bandwidth link.

30. The method as recited in claim 29, wherein the mobile network device has moved from a high bandwidth link to a low bandwidth link when the link has a lower bandwidth than a link via which the mobile network node has previously registered with the network device.

31. The method as recited in claim 29, wherein determining whether the mobile network device has moved from a high bandwidth link to a low bandwidth link comprises:
   obtaining link characteristics associated with a previous session from a table; and
   comparing the link characteristics associated with the previous session with link characteristics associated with a current session.

32. The method as recited in claim 29, wherein the network device is a Home Agent, the method further comprising:
   sending an ICMP source quench message to a Correspondent Node, wherein a source IP address of the ICMP source quench message is an IP address of the mobile network node;
   wherein sending the ICMP source quench message is performed when it is determined that the mobile network device has moved from a high bandwidth link to a low bandwidth link.

33. The method as recited in claim 29, wherein the network device is a Home Agent, the method further comprising:
   sending one or more messages to a Correspondent Node indicating that a window size is zero;
   wherein sending the one or more messages is performed when it is determined that the mobile network device has moved from a high bandwidth link to a low bandwidth link.

34. The method as recited in claim 33, wherein a source IP address of each of the messages is an IP address of a node communicating with the Correspondent Node.

35. The method as recited in claim 29, wherein the network device is a Correspondent Node.

36. The method as recited in claim 29, further comprising:
   filtering traffic according to priority when it is determined that the mobile network device has moved from a high bandwidth link to a low bandwidth link.

37. In a network device, a method of registering a mobile network device with the network device, comprising:
   receiving a registration request from the mobile network device, the registration request including link characteristics, the link characteristics being associated with a link via which the registration request message has been sent to the network device;
   authenticating the mobile network device;
   composing a registration reply indicating success or failure of the registration of the mobile network device with the network device, wherein a session is created when registration is successful;
   sending the registration reply to the mobile network device;
   when registration is successful, updating a table associating the link characteristics with the session; and
   sending an ICMP source quench message to the mobile network device, wherein a source IP address of the ICMP source quench message is an IP address of the network device;
   wherein sending the ICMP source quench message is performed when it is determined that the mobile network device has moved from a high bandwidth link to a low bandwidth link, wherein the network device is a Correspondent Node.

38. In a network device, a method of registering a mobile network device with the network device, comprising:
   receiving a registration request from the mobile network device, the registration request including link characteristics, the link characteristics being associated with a link via which the registration request message has been sent to the network device;
   authenticating the mobile network device;
   composing a registration reply indicating success or failure of the registration of the mobile network device with the network device, wherein a session is created when registration is successful;
   sending the registration reply to the mobile network device;
   when registration is successful, updating a table associating the link characteristics with the session; and
   sending one or more messages to the mobile network device indicating that a window size is zero;
   wherein sending the one or more messages is performed when it is determined that the mobile network device has moved from a high bandwidth link to a low bandwidth link, wherein the network device is a Correspondent Node.

* * * * *

UNITED STATES PATENT AND TRADEMARK OFFICE
CERTIFICATE OF CORRECTION

PATENT NO.       : 7,633,917 B2                                         Page 1 of 1
APPLICATION NO.  : 11/372598
DATED            : December 15, 2009
INVENTOR(S)      : Patel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 846 days.

Signed and Sealed this

Twenty-first Day of December, 2010

David J. Kappos
*Director of the United States Patent and Trademark Office*